Figure 8:
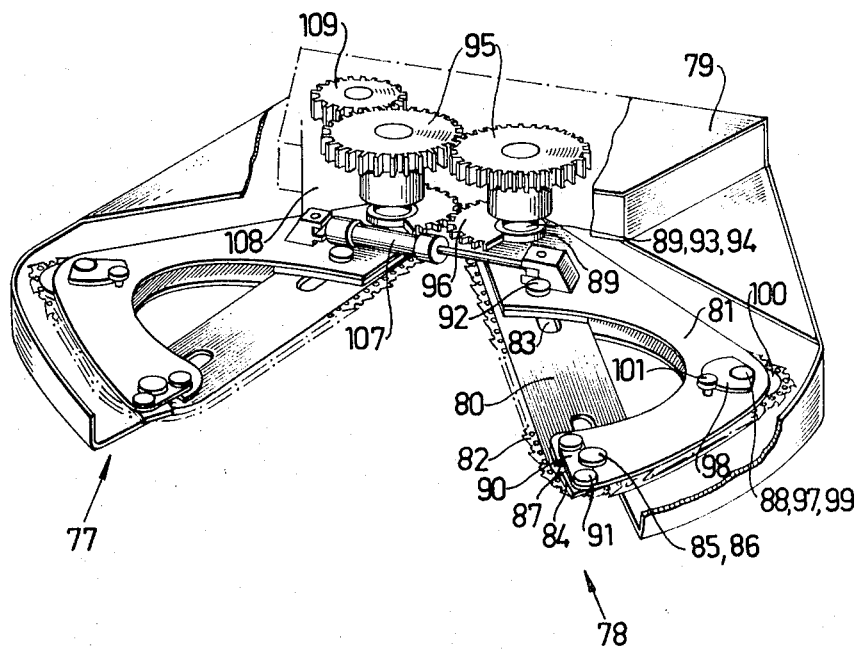

United States Patent

[11] 3,620,272

| [72] | Inventors | Erik Helmer Eriksson<br>Soderhamn;<br>Lars-Gunnar Hogberg, Ornskoldsvik; Carl Peter Seth Kempe, Ornskoldsvik; Stig-Gunnar Lofgren, Ornskoldsvik, all of Sweden |
|---|---|---|
| [21] | Appl. No. | 5,885 |
| [22] | Filed | Jan. 26, 1970 |
| [45] | Patented | Nov. 16, 1971 |
| [73] | Assignee | Mo och Domsj Aktiebolag<br>Ornskoldsvik, Sweden |
| [32] | Priority | Jan. 27, 1969 |
| [33] | | Sweden |
| [31] | | 1053/69 |

[54] METHOD AND MACHINE FOR FELLING, DEBRANCHING, COLLECTING AND BUNDLING TREES
23 Claims, 19 Drawing Figs.

[52] U.S. Cl. ..................................... 144/3 D,
144/309 AC, 144/2 Z
[51] Int. Cl. ........................................ A01g 23/02
[50] Field of Search ............................. 144/2 Z, 3 D, 34 R, 34 E, 309 AC

[56] References Cited
UNITED STATES PATENTS
3,385,333  5/1968  Eynon .................. 144/2 Z Primary Examiner—Gerald A. Dost
Attorney—Janes & Chapman ABSTRACT: Apparatus and process are provided for felling, debranching, collecting and bundling trees, in which the tree is gripped, cut, and felled to a position substantially parallel with the ground, in one continuous working sequence, and is then immediately transported in its longitudinal direction through a debranching means in which the branches are separated from the trunk or a portion thereof. The debranched trunk or portion is severed, and is conveyed crosswise to a collection means, and bundled.

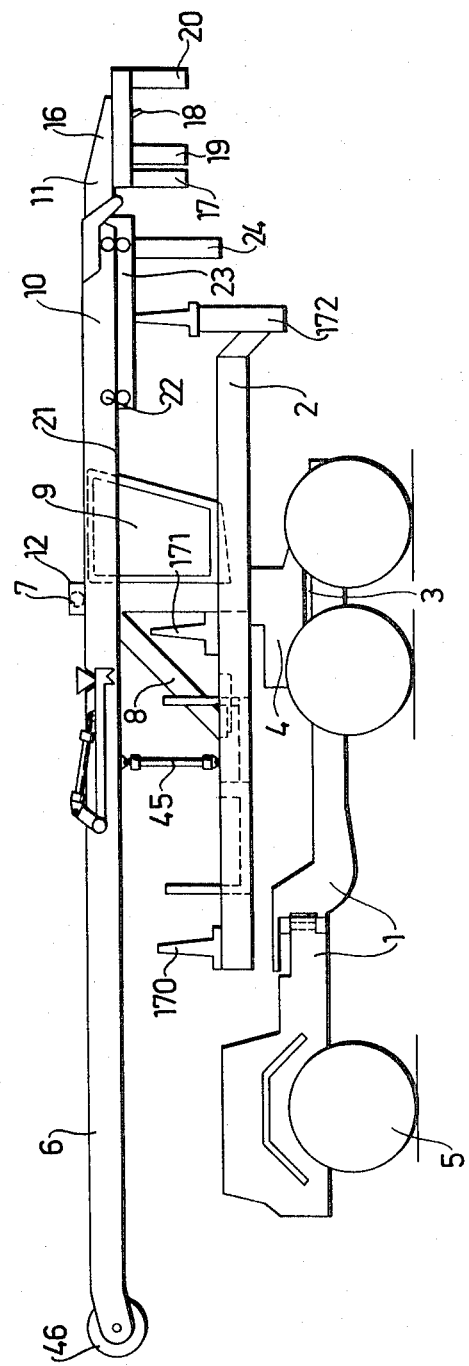

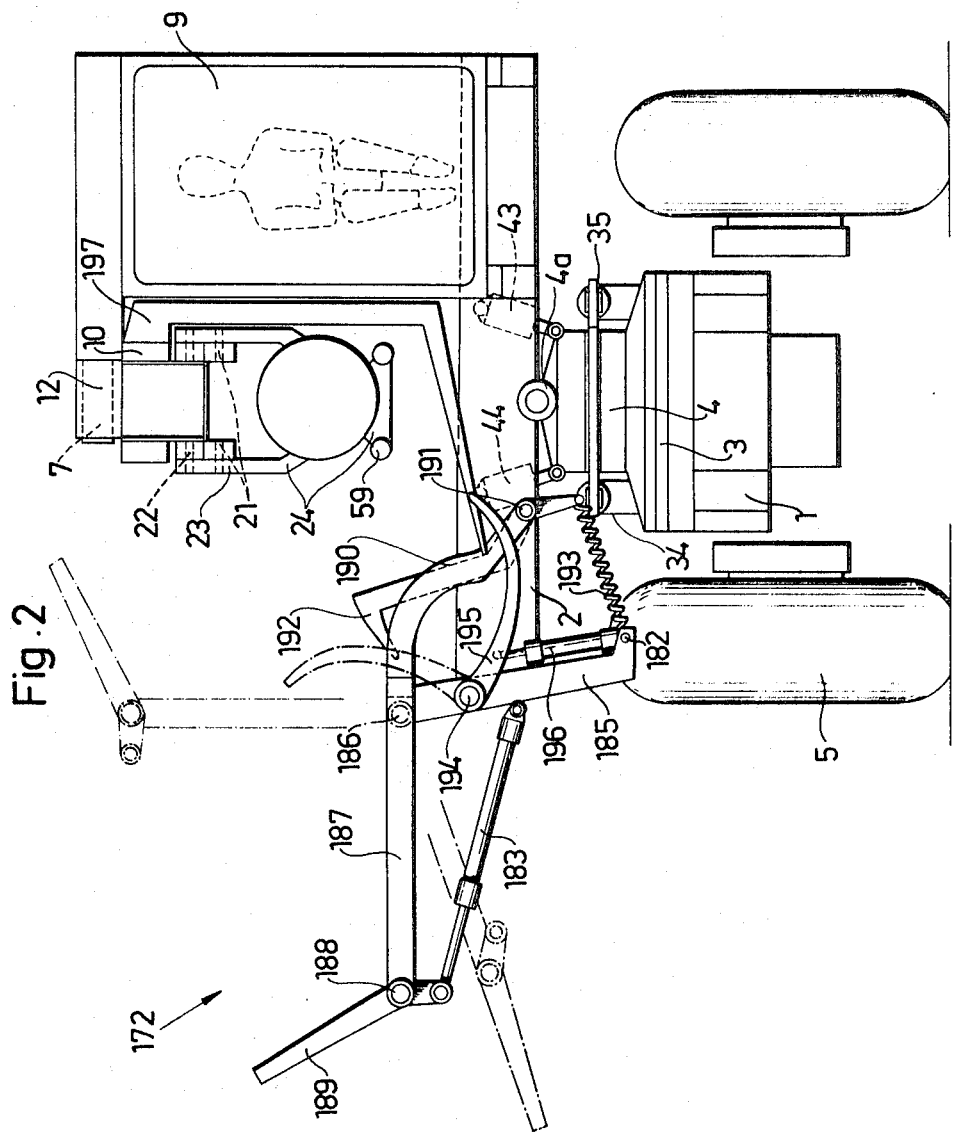

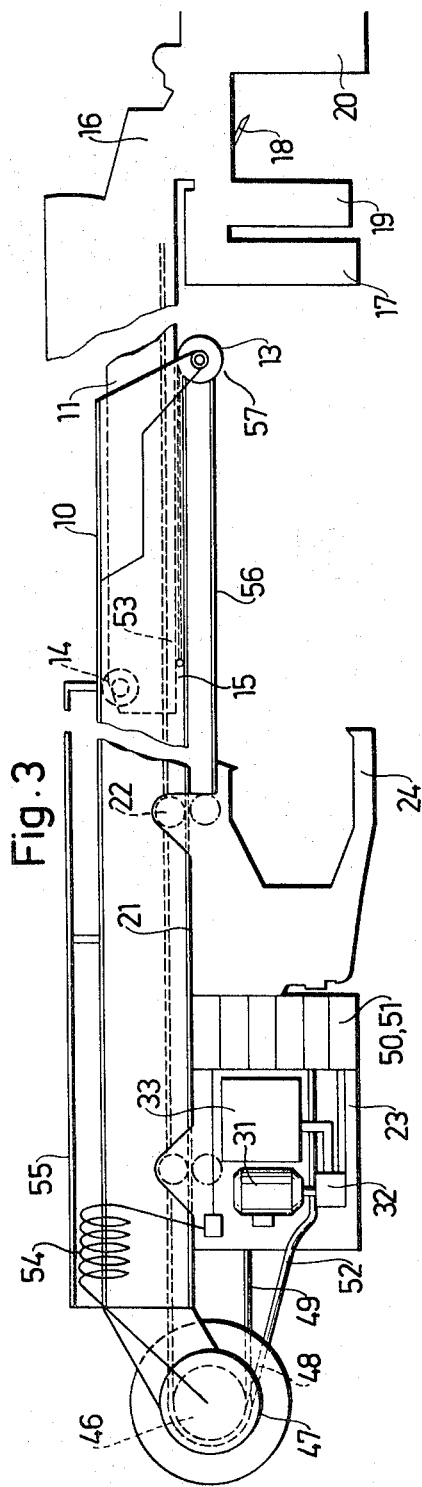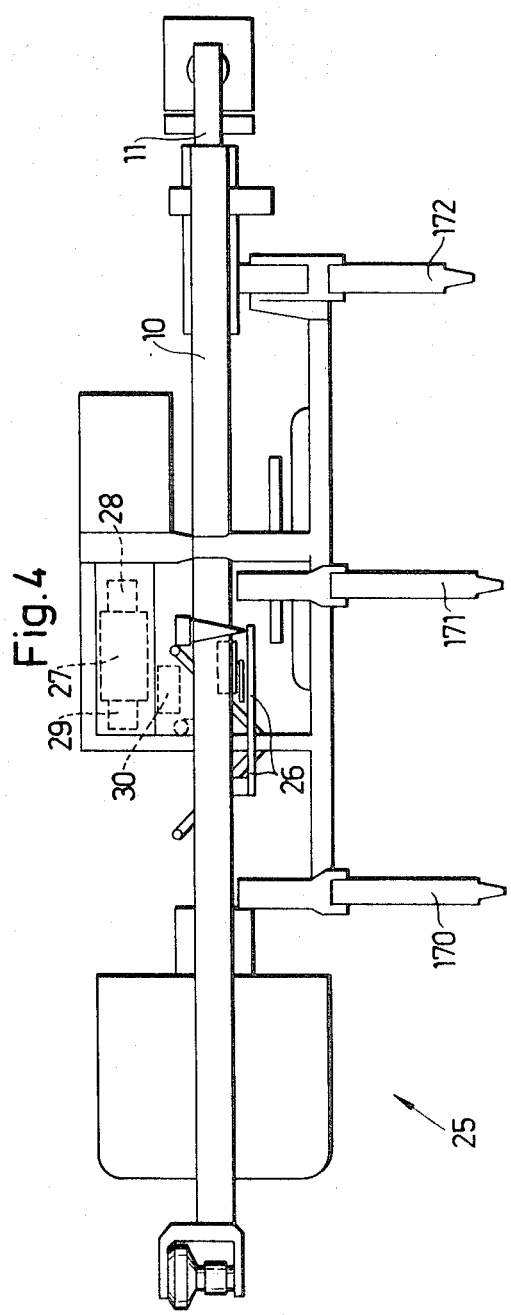

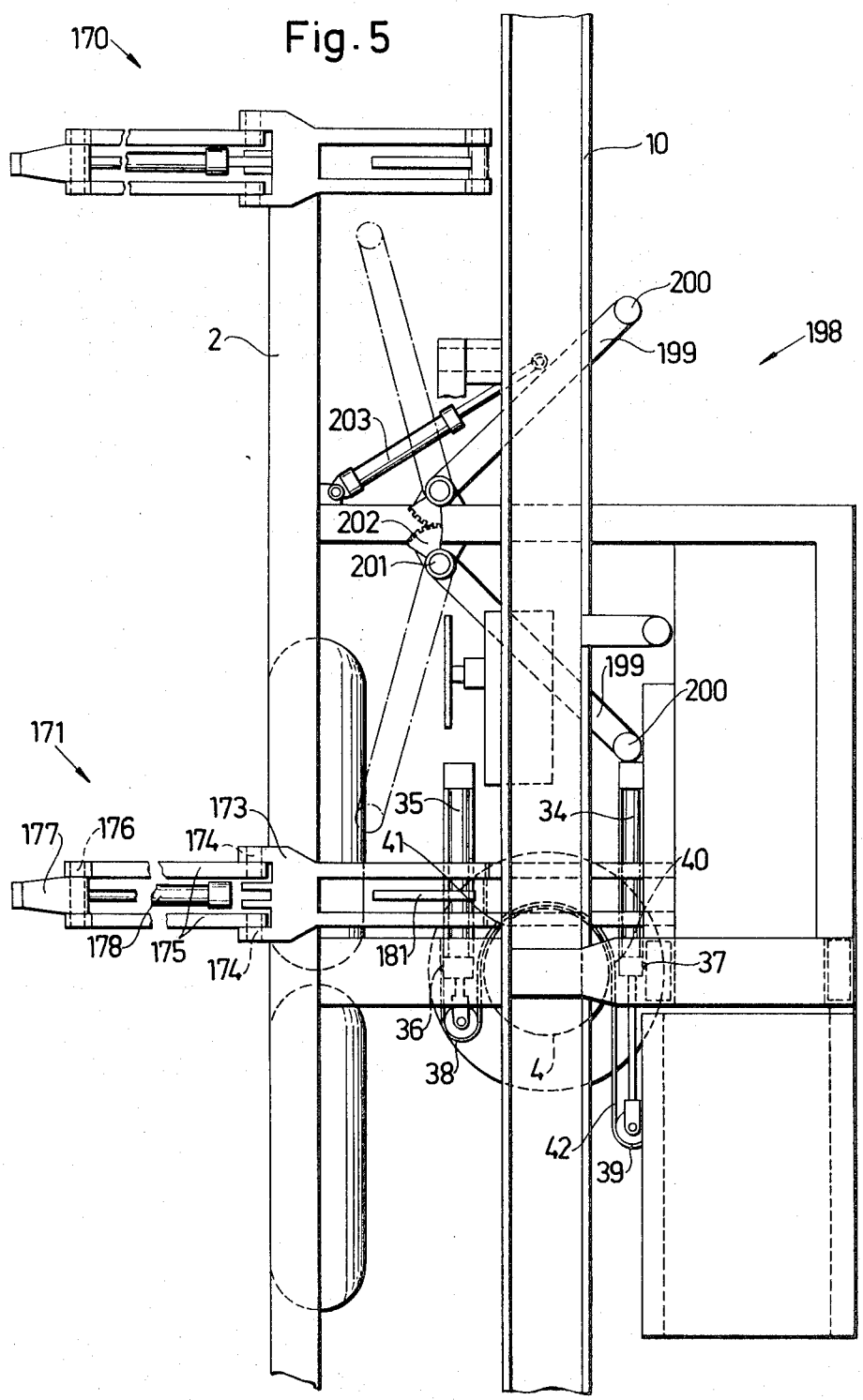

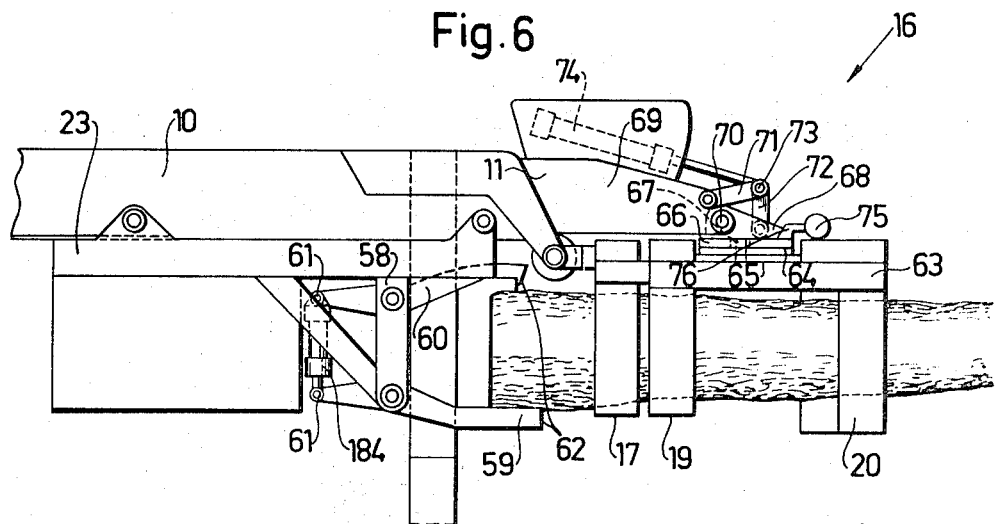
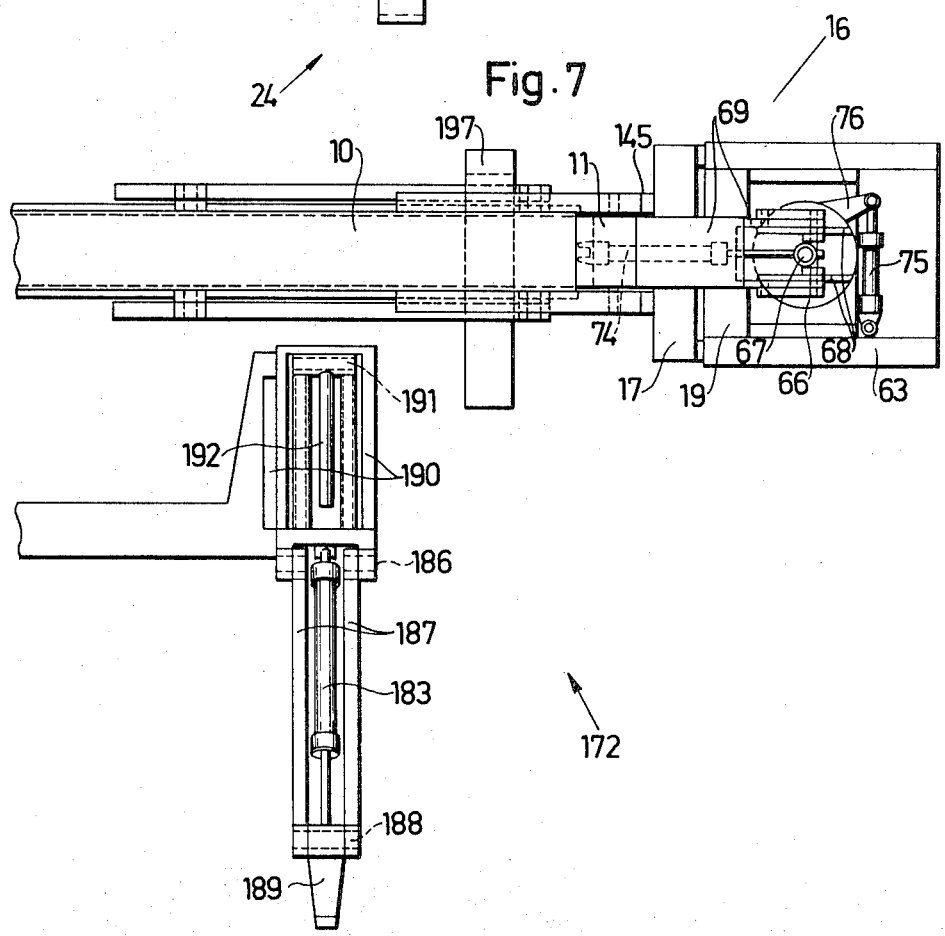

B-B

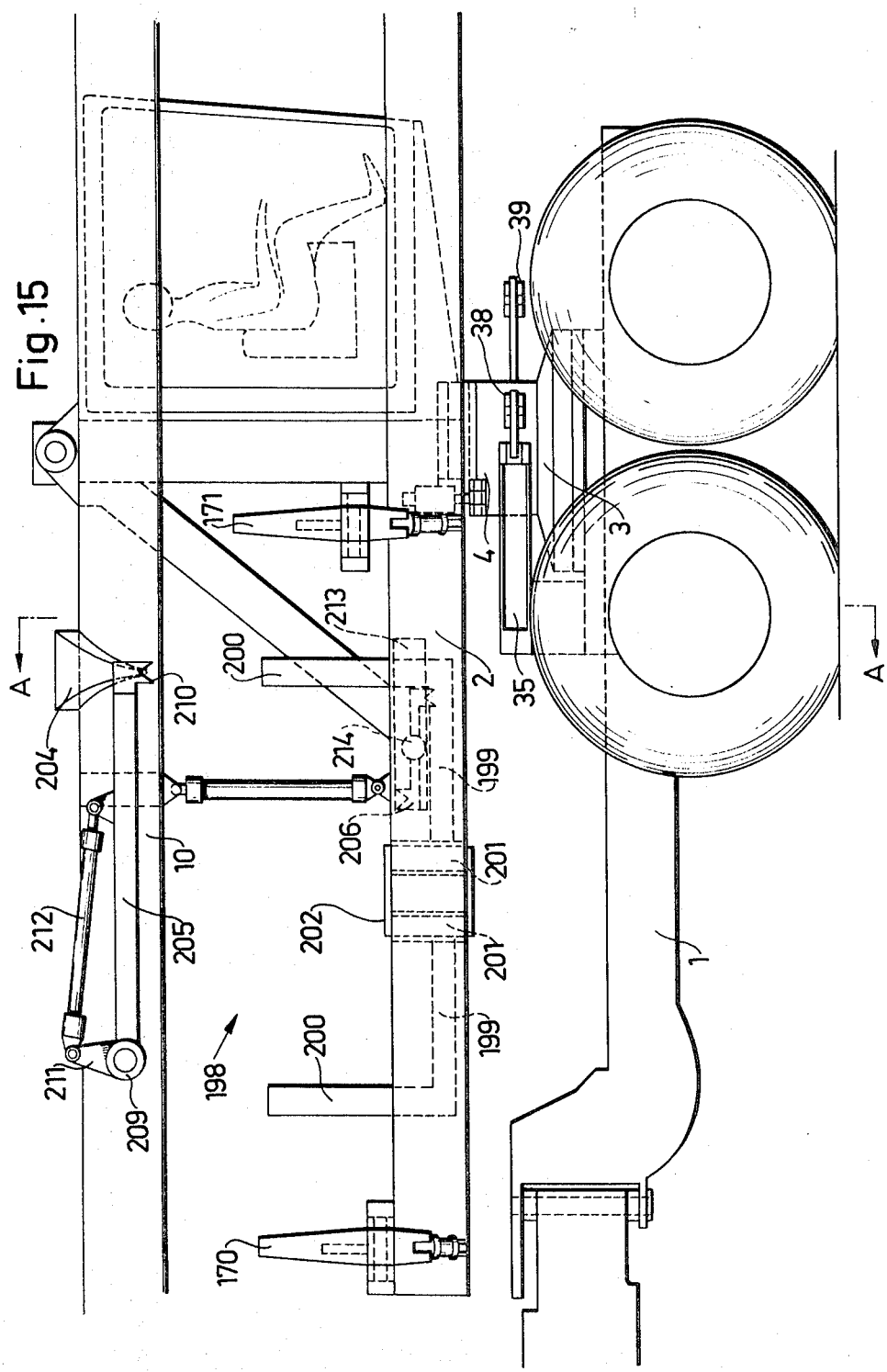

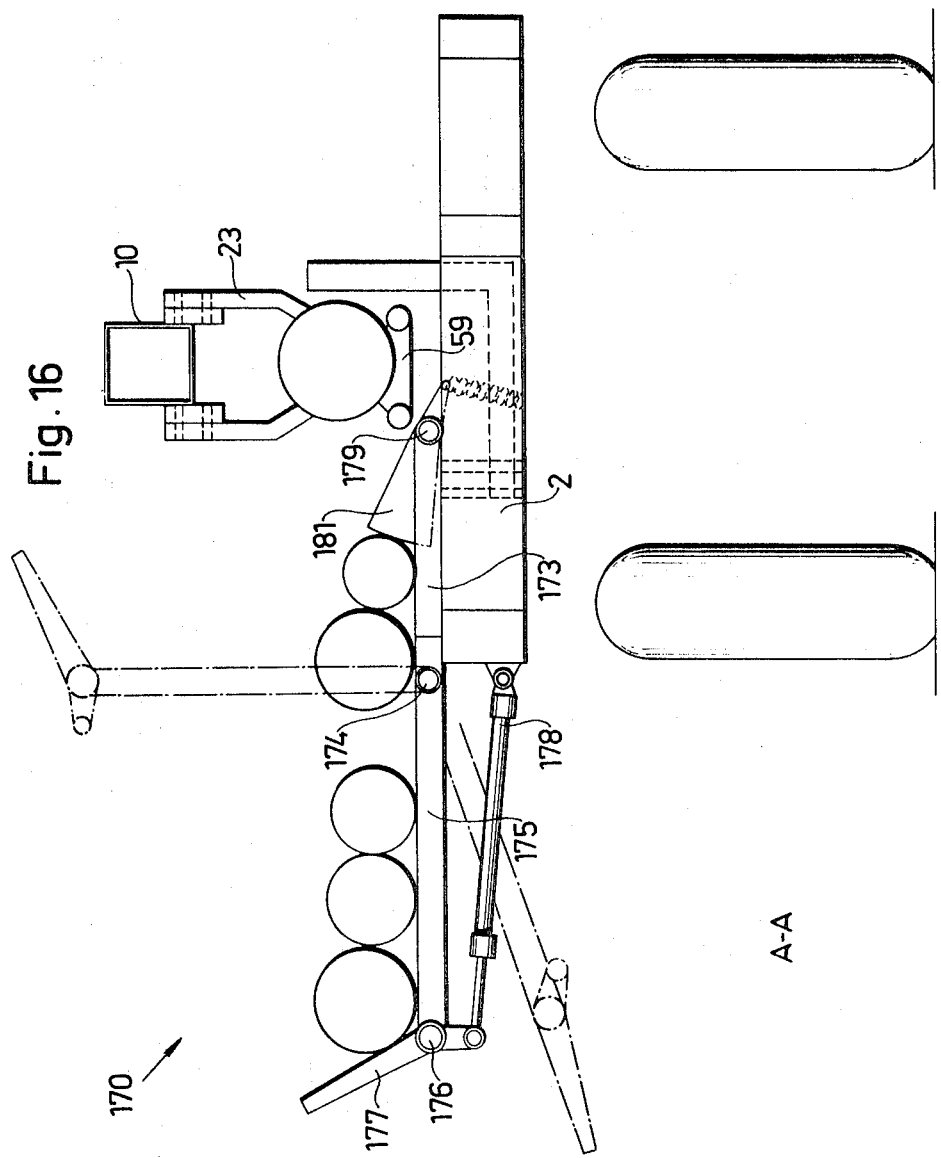

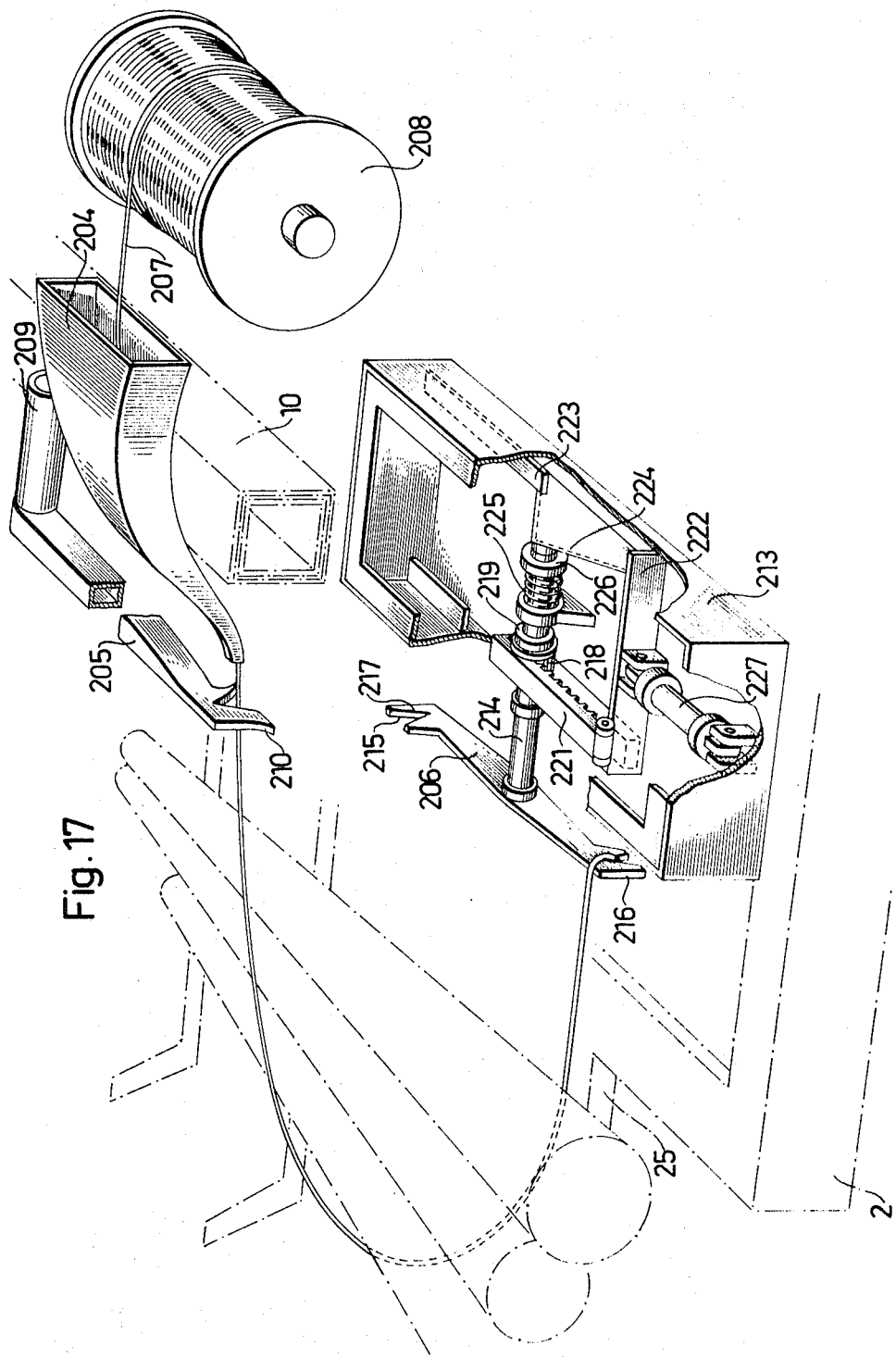

METHOD AND MACHINE FOR FELLING, DEBRANCHING, COLLECTING AND BUNDLING TREES

The present invention relates to a method and a machine by which in one continuous working sequence trees can be felled, debranched and topped and the debranched trunks collected together and bundled for loading and further transport to highways, waterways etc.

Transport in one form or another dominates the working tasks normally associated with removing wood from the forests. To a large extent this is the result of the wide geographic extension of the forest and the wide dispersion of the wood units. All attempts which have been made to mechanize the forest industry and to reduce the costs of felling and debranching trees have, however, primarily been concerned with improving methods and creating novel constructions of machines for use in the various sequences of working the wood. These novel methods and machines have generally contributed toward lowering the costs of the different working sequences, while the really large costs, which are associated with moving the wood across country, have not been appreciably touched upon. This is particularly applicable to the removal of the wood units from the felling site and transporting them to small piles adjacent the branch roads moving into the forest, the so-called brossling, which constitutes the heaviest work undertaken in conventional wood felling and clearing operations, although the question of transport between the different working and treatment stations has awoken but small interest from the aspect of rationalization. The main reason for these lines of mechanical rationalization is that the possibility of effectively reducing the costs of transporting the wood through the surrounding terrain by improved methods and machines has hitherto been considered very small owing to the multitude of special problems associated therewith. Mechanization of the forest industry as a whole places large requirements on the area of trees felled and debranched, the conditions of surrounding countryside, the volume of trees to be debranched and felled per acre of wood land, the manner in which the trees are felled and debranched and their nearness to roads capable of carrying heavy traffic. These requirements are very difficult to coordinate and have often required the investment of considerable capital without the returns meeting up to expectations. This is particularly true of the attempts to mechanize the felling and debranching of trees and the correlation of the working sequences entailed.

Of the different working sequences debranching is the most time consuming and is consequently the primary subject for mechanization. When practising known debranching methods, the branches are removed either before or after the tree is felled. The former method, however, is highly unsuitable when processing trees for use as sawing timber. This is due to the fact that the tree when debranched in an upright position looses the effective impact-damping protection which the branches afford as the tree strikes the ground, which often results in the tree breaking and splitting as it strikes the ground. Another disadvantage with debranching of trees in an upright position is that the machines used are clumsy, complicated and difficult to manage as a result of the vertical extension of the tree. In view of these disadvantages, it is therefore preferable that the tree is felled before being debranched. With regard to mechanizing the felling operation, the economic space for a felling machine is, however, so small that such a machine must be capable of being coordinated with primarily the debranching operation in a manner which is so effective that it is able to compete with conventional felling operations using motor saws. The methods and apparatus used hitherto for this purpose do not provide satisfactory solutions to the problem.

The machines known to the art for debranching felled trees are usually very effective in comparison with conventional debranching methods using an axe or a motor saw. To avoid unnecessary and expensive transport of the branches etc. attached to the tree trunk it is naturally to advantage if the debranching machine is positioned as close to the felling site as possible. One great disadvantage in this respect, however, is that it is difficult to integrate a machine positioned in this way in the remaining felling sequences in a manner which actively contributes towards reducing the total felling costs. The reason for this is that the work of conveying the wood to and from the debranching machine positioned in the terrain is difficult to superintend and preplan, owing to the normally greatly varying terrain conditions and the varying distances between the felling sites and the machine. This often means that the machine stands idle as a result of insufficient personnel and tractors for conveying the wood in step with the capacity of the machine. The conditions, however, can also be the reverse, that is to say that the number of personnel and tractors concentrated about the machine is so large that a large number of them are, at times, temporarily idle. In both instances the costs of felled wood per unit volume are high and productivity low. It is therefore important that methods and machines are provided for integrating the different working sequences of felling forests into one continuous working sequence. The third working sequence mentioned above, and one which is normally proceeded by long distance transport of the debranched trunks, is bundling. Neither has it been possible hitherto to mechanize this working sequence to a desirable degree, whether it be for the purpose of simplifying or expediting the work involved therein or shortening the distance over which the trunks are transported.

The present invention is concerned with the problem of integration and relates to a method for felling, debranching, topping, collecting and bundling trees, and is characterized in that each separate tree in one continuous working sequence is gripped, topped and felled to a position substantially parallel to the ground surface and is immediately thereafter conveyed in its longitudinal direction in one or more steps through or beyond a debranching means by which the branches are separated from the trunk or that portion of the trunk which while in transport passes the debranching means, whereafter the debranched trunk or trunk portion is conveyed transversally thereof to an adjacent collecting means, subsequent to being topped when suitable, by which it is bundled together with other similarly treated trunks or trunk portions by means of wire, bands, chains or the like.

The present invention also relates to a machine for carrying out the method, the machine being characterized by a combination of a frame structure capable of being rotated horizontally on a support and elongated jib arranged for vertical rotation on the frame structure, a gripping device for securely holding a tree while standing on its roots and for retaining the tree when it is felled, a first means for topping the upright tree, a means for felling the tree after it has been topped, a means for debranching the felled tree and a means for advancing the tree longitudinally during the debranching operation through the debranching means, the first cutting means also being adapted to cut the portion of the tree which while being advanced has passed through the debranching machine. The machine is also characterized by a second cutting means adapted to automatically cut the tree at a specific predetermined minimum diameter of the portion of the tree which while being advanced passes through the debranching means, a means for collecting the debranched trees or portions of the trees, a means for bundling the same together by means of iron wire, band, wires, chains or the like, and by means for mechanically operating the above-mentioned movable devices of the machine, the devices for holding, cutting, felling and debranching the tree being mounted on one end of the jib, the advancing means being displaceable along the jib and the collecting and bundling means being mounted on the frame structure adjacent each other.

One object of the invention is to eliminate the work associated with the transportation of the wood units from the felling site to the branch roads accessible to terrain tractors. This is to very great advantage, since this work, which is often carried out manually with or without the assistance of winches, constitutes the heaviest and one of the most expensive working sequences associated with forest felling activities.

Another object of the invention is to facilitate the handling and transport of the trees by separating the branches, knots and tops from the trunk immediately the tree has been felled. This obviates the necessity of transporting the bulky appendages of the trees. Handling and transport of the trees is also facilitated in that the trees can be debranched in stages, between which the debranched trunk is cut up. This enables trees whose lengths exceed the maximum permitted length for transport on public highways to be debranched directly after being felled, without preceding manual cutting into shorter lengths.

Yet another object of the invention is to combine the functions of felling, debranching, topping and bundling of the trees into one continuous working operation, so that said functions can be served by one man only. One great advantage in this connection is that the debranching unit becomes self-supporting with regard to the supply of wood.

As will be evident from the following, the means for moving the tree longitudinally during the debranching operation and the debranching means are movable arranged. The intention herewith is to make possible a very high tree processing effect without it being necessary to accelerate the heavy tree to high speeds. The arrangement also affords the advantage by which the amount of energy consumed during the debranching operation is considerably less than when the debranching means is stationarily arranged in a conventional manner.

Figure 9:
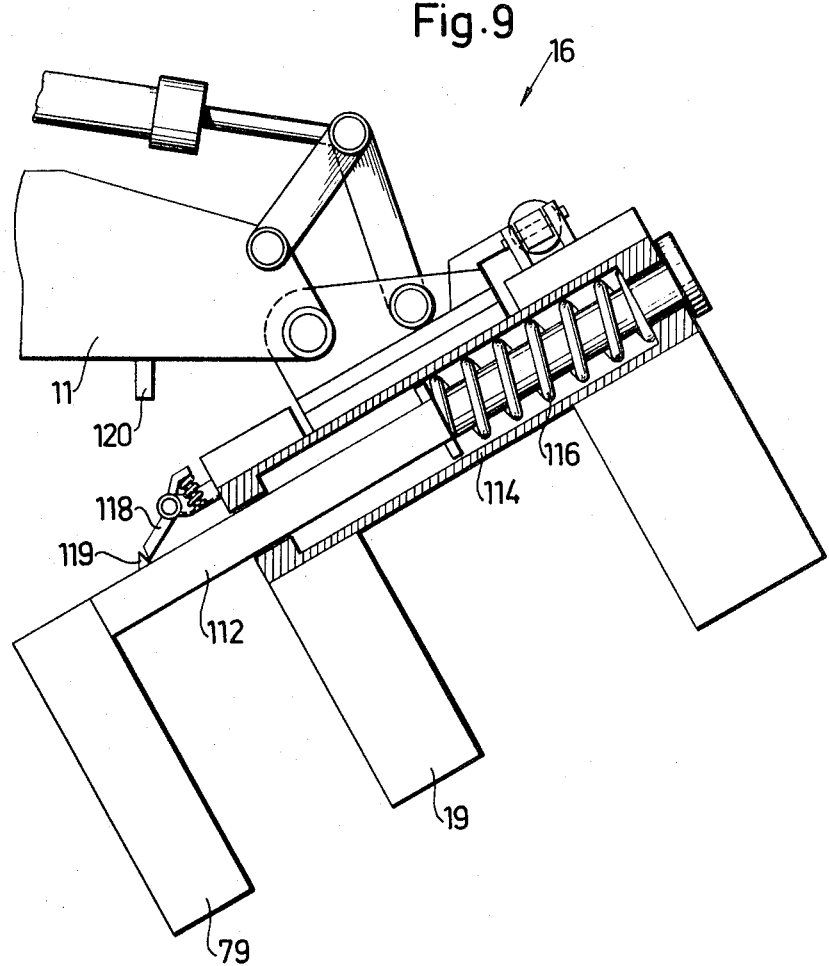
Figure 10:
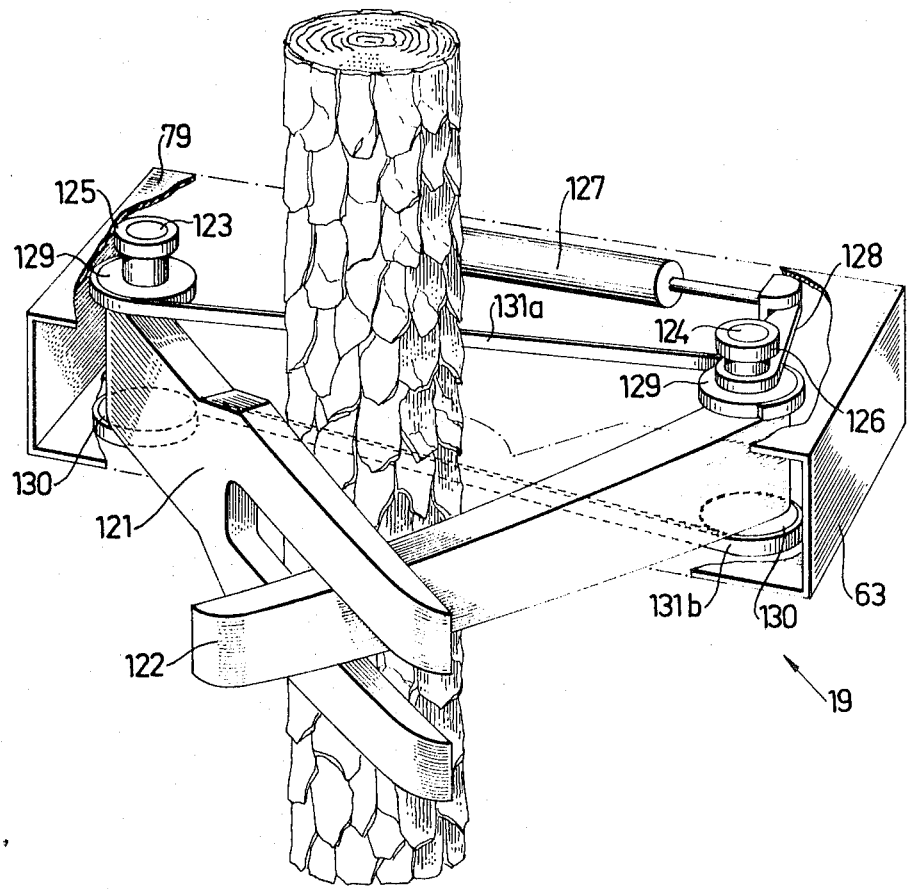
Figure 11:
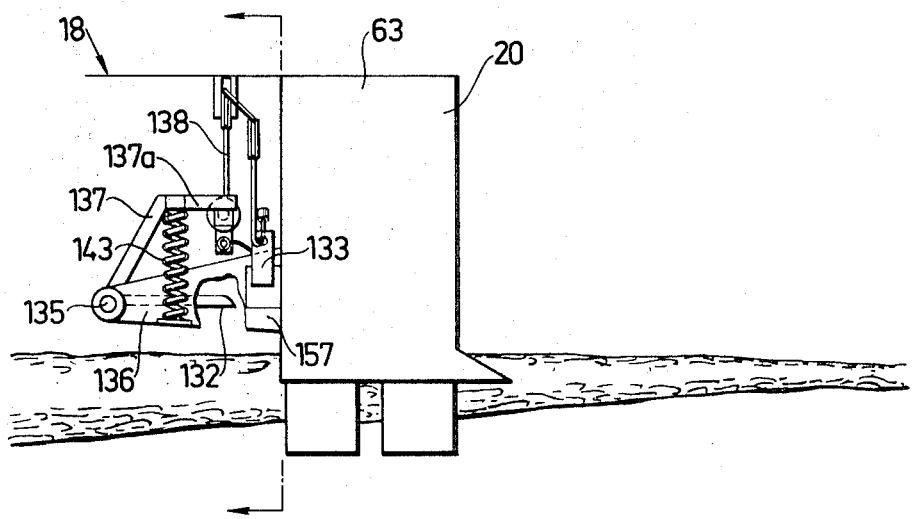
Figure 12:
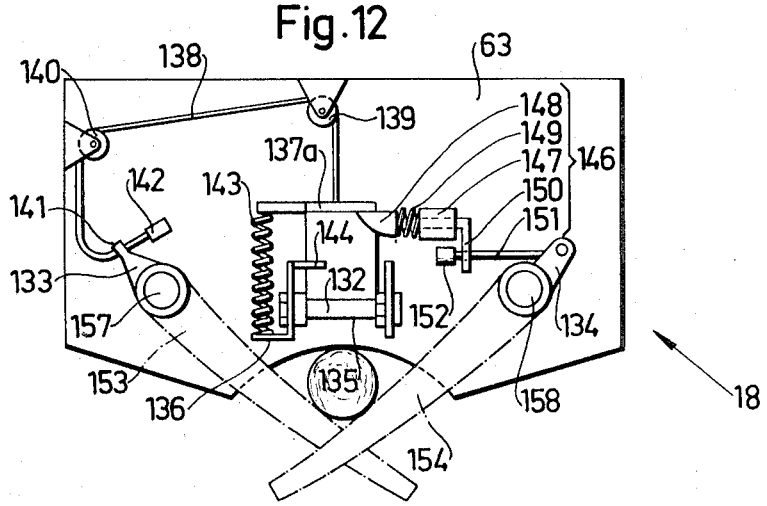
Figure 14:
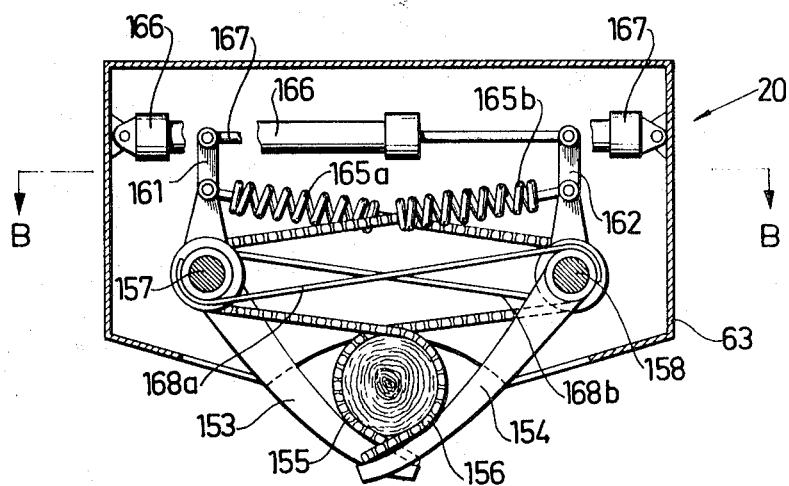
Figure 13:
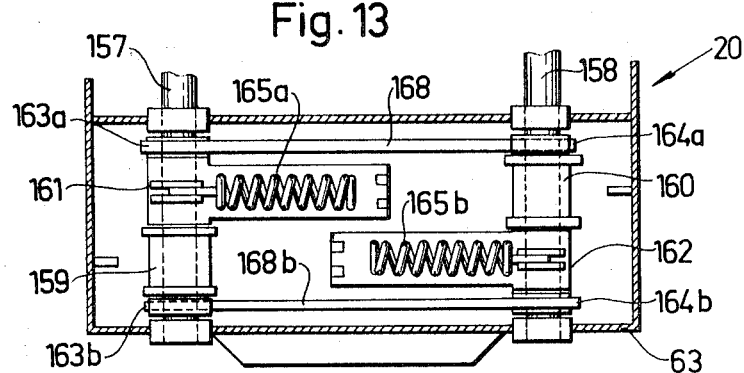
Figure 18:
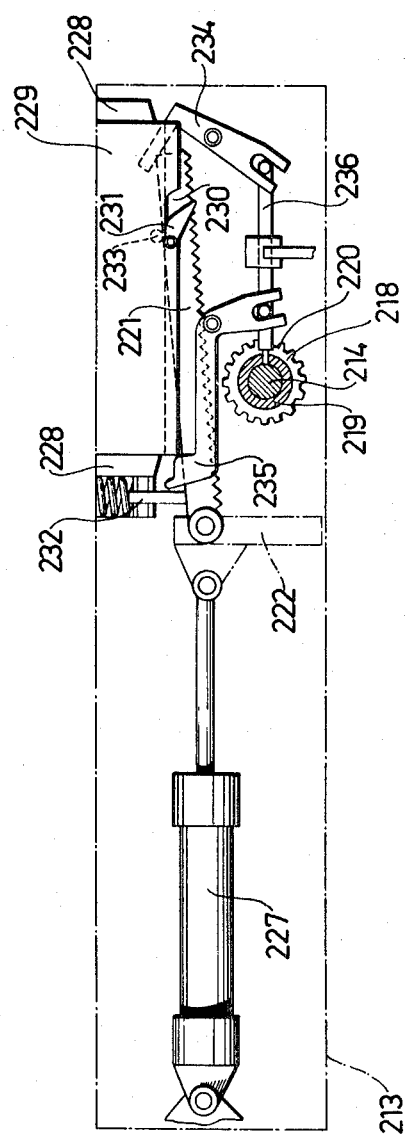
Figure 19:
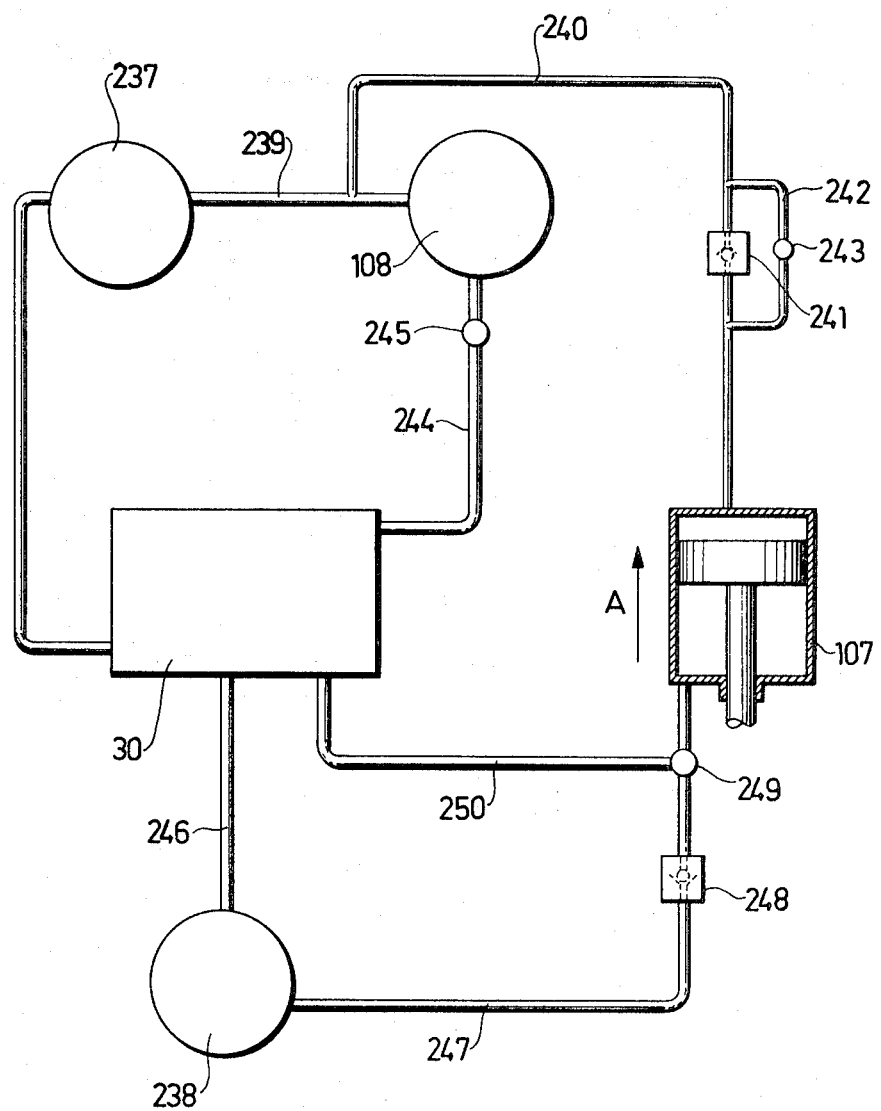

The invention will now be described with reference to an embodiment of an apparatus constructed in accordance with the invention and to the appended drawings, of which FIG. 1 is a side view of the machine, FIG. 2 is a front view of the machine, FIG. 3 is a longitudinal section through a jib mounted on the machine and adapted to handle the trees, a tree advancing carriage arranged for movement along the jib, and means for driving the jib and the carriage, FIG. 4 is a horizontal view of the machine, FIG. 5 is a horizontal view of a means for swinging the jib in the horizontal plane and a means for transversely transporting the debranched trees, FIG. 6 is a side view of the tree advancing carriage, a yoke secured to the end of the beam and means mounted to the yoke for cutting, holding, topping and debranching the trees, FIG. 7 is a horizontal view of the yoke and of an element which cooperates with a means for collecting the debranched trees, FIG. 8 is a perspective view of the tree-cutting means, FIG. 9 is a cross section through the yoke and the tree-cutting means, illustrating how said means is movable on the yoke, FIG. 10 illustrates the tree-holding means in perspective, FIG. 11 is a side view of the tree-topping means, FIG. 12 is a cross section of the tree-topping means, FIG. 13 is a cross section through the debranching means parallel with the direction in which the trees are advanced therethrough, FIG. 14 is a cross section through the debranching means at right angles to the direction in which the trees are advanced therethrough, FIG. 15 is a side view of the means shown in the horizontal plane in FIG. 5, FIG. 16 is a cross section through the machine of FIG. 15, FIG. 17 is a perspective view of the bundling means, FIG. 18 illustrates an arrangement for controlling the bundling sequence and FIG. 19 shows a modification of the drive system of the tree-cutting means illustrated in FIG. 8.

In FIGS. 1 and 2 the reference numeral 1 identifies the machine support structure and 2 a frame structure arranged on said support. The support structure and the frame structure each comprise a welded structure of strong square beams. Securely mounted to the support structure is a slew baseplate 3 on which a tube 4, arranged on the under surface of the frame structure, bears so that the frame structure can be rotated in the horizontal plane relative to the support structure and is carried by the slew baseplate thereon. The frame structure 2 is also arranged for rotation on the tube 4 about a shaft 4a so that said structure can be turned in the vertical plane relative to the tube, the slew baseplate and the support structure. The support structure is provided with six large wheels 5 and a propelling motor (not shown) for driving the outer wheel pairs, and is guided in a known manner by means of hydraulic so-called frame control. An elongated jib 6 is mounted for rotation in the vertical plane about a trunnion 7, which in turn is supported by a frame structure 8 mounted on the frame structure 2. Arranged on the frame structure 2 is also a cabin 9 which accompanies the rotary movements of said structure and from which the advancing motor and the different movable devices of the machine can be operated. The jib 6 comprises two beams 10 and 11, each of which has a boxlike cross section, the beams being arranged so that the beam 11 is telescopically movable within the beam 10 between two end positions. Securely mounted on the upper surface of the beam 10 is a bearing 12 in which the trunnion 7 is journaled, whereby the beam 10 is supported by the trunnion 7 suspended therein. When occupying one of the aforesaid end positions, the greater length of the beam 11 is housed in the beam 10 (FIG. 1 shows the beam 11 in this position), while in the other of said end positions beam 11 projects out from one end of beam 10. This end and the corresponding end of the machine in general is called in the following the forward end. In the exemplary embodiment, the beams 10 and 11 each have a length of 11 meters. The beam 11 is journaled in the beam 10 by means of two rotatably journaled support rollers 13, 14 (FIG. 3) and a Teflon bearing 15. The support roller 13 is mounted in the front end of the beam 10 and bears against the underneath of beam 11, while the support roller 14 is mounted in the rear end of the beam 11 and bears against the upper, horizontal plate of the beam 10. The Teflon bearing 15 is mounted on the underside of the rear end of the beam 11. The beam 11 supports at its free end a yoke 16 structure, which is rotatable in two planes and on which two cutting or severing means 17 and 18, a gripping means 19 and a debranching means 10 are mounted.

The construction of the beam 10 is such that its underside protrudes slightly beyond the longitudinally extending vertical sides of the beam, whereby a shoulder 21 is formed on either side of the beam along the whole length thereof. A feed carriage 23, provided with eight wheels 22, is mounted beneath the beam 10 so that the wheels run in pairs on either side of the shoulders 21, whereby the feed carriage is movable along the shoulders, between the ends of the beam. The wheels are provided with flanges to take up any lateral forces acting on the feed carriage and to guide the carriage in its movements. Securely mounted at the front portion of the feed carriage is a gripping means 24 (see also FIG. 6). A means 25 for collecting the debranched trunks is securely attached on the frame structure 2 and participates in its rotary movements (see also FIG. 4). Also arranged on the frame structure is a means 26 for bundling together the trunks located in the collecting means 25.

All the movable components of the machine are operated hydraulically. The energy source is in the form of a combustion engine 26 arranged on the frame structure 2. The motor 27 is shown in the Figure in ghost lines. Also arranged on the frame structure 2 are an electric generator 28, a hydraulic pump 29 and an oil container 30. The generator and the pump are connected directly to the motor 27, while the suction side of the pump is connected to the oil container. The generator 23 is electrically connected to an electric motor 31 attached to the feed carriage 23 (see FIG. 3). Arranged on the feed carriage 23 is a hydraulic pump 32, which is connected directly to the motor 31 and driven by the same. Arranged on the feed carriage is also an oil container 33, to which the suction side of the pump is connected.

Rotation of the frame structure 2 on the slewing plate 3 is effected by means of two hydraulic cylinders 34, 35 which are securely attached to the support structure 1 on either side of the tube 4, and arranged parallel with each other (see FIG. 5). Each of the hydraulic cylinders is provided on the cylindrical surface of the cylinder with a fixed eye or loop 36, 37 and on the free end of the piston rod with a bridle or direction changing wheel 38, 39. An eye 40 is securely mounted to the cylindrical surface of the tube 4. To identical chains 41, 42 are connected at their ends between the eye 40 and respective eyes 36, 37 so that each chain is in engagement with and curved over the corresponding bridle or direction changing wheel. The eye 40 is, in relation to the chain wheels, attached to the tube 4 so that the frame 2 can be rotated by the hydraulic cylinders through approximately one half turn. The hydraulic cylinders 34, 35 are interconnected via oil conduits and are driven synchronously with each other and in opposite directions. In this way, the chains are held tensioned independently of the position of rotation of the frame 2. To prevent the loads on the slew plate 3 from becoming too high when the beam 11 is in its forward end position, the beam 10 is mounted on the trunnion 7 so that only about 40 percent of the length of the beam is located on the forward side of the trunnion.

To compensate for possible ground slope at the working sites the frame 2, as mentioned above, is rotatable in the vertical plane relative to the machine support structure 1. To provide for this rotation, two hydraulic cylinders 43, 44 are pivotally connected between the tube and the frame structure, on either side of the axes of rotation 4a (see FIG. 2).

A hydraulic cylinder 45 is pivotally connected between the frame 2 and the beam 10 (see FIG. 1) so that the beam 10 can be rotated about the trunnion 7 by the hydraulic cylinder. The rotary movement is restricted by a damping means mounted in a known manner in the hydraulic cylinder.

A hydraulic twist motor 46 is mounted at the rear end of the beam 10 and connecte d to the feed carriage 25 and the beam 11 for synchronously driving the same.

The twist motor 46 supports on its output shaft a chain wheel 47 and a flanged hose drum 48 (see also FIG. 3). A chain 49 is attached to the rear portion of the feed carriage 23 and extends therefrom rearwardly to the chain wheel 47. Subsequent to being passed over the chain wheel, the chain is then drawn forwards through and parallel with the beam 10 and on to the rear end of the beam 11, where it is anchored. Positioned on the feed carriage 23 is also a valve box 50, which is connected with the outlet of the pump 32 arranged on said carriage. The valve box contains valves 51, which can be electrically operated from the cabin 9 and each of which is connected to a high-pressure hose 52 and can connect said hose with the outlet side of the pump 32. Only one of the high-pressure hoses are shown in the drawing. The high-pressure hoses 52 are drawn rearwardly from the valve box 50 to the hose drum 48, passed over the drum and forwards through the beam 10 to high-pressure tubes 53 mounted securely in the beam 11 (only one of the tubes 53 being shown in the drawings). Electrical conduits are passed from the motor 31 of the valve 51 to a control panel arranged in the cabin 9, from which panel an electric conduit is in turn passed to the generator 28 arranged on the frame structure 2. The conduits from the motor 31 and the valves 51 are suspended in a known manner in cable carriages 54, which are movably arranged in section bars 55 secured on the beam 10.

A chain 56 is attached at the forward portion of the feed carriage and extends forwardly thereof to a direction changing or bridle wheel 57 mounted to the front end of the beam 10. The chain is passed rearwardly from the direction changing wheel at the side of the support rear 13 to the rear end of beam 11, in which it is secured. To enable the tension in the chains 49 and 56 to be adjusted as desired, a chain-tensioning means is arranged between each chain and the feed carriage 23. A resilient abutment is mounted at each end of the beam 11 and restricts the movement of the beam and the feed carriage in respective end positions. The chain-tensioning means and the resilient abutments are not shown in the figures. Positioned in the front end of the beam 10 is a resilient stop shoulder 145, the function of which will be described in the following.

Since the feed carriage 23, the beam 11 and the chains 49 and 56 together form a closed path, the feed carriage and the beam will be moved in opposite directions and synchronously with each other when the drive motor 46 is activated.

The gripping means 24 in the forward portion of the feed carriage 23 is comprised of two essentially identical gripping claws 59, 60 (see FIG. 6) arranged on a bracket member 58. Each gripping claw comprises two pairwise arranged leg members, which at one end are securely connected with a shaft 61 and at the other end are connected with each other by means of sharp-edged gripping tool 62. The edge of the tool is concave in shape when seen in its longitudinal direction and extends transversely of the conceived path along which the tree is conveyed. Each leg member is mounted between its ends for rotation in the bracket member, so that it forms a double-arm lever. A hydraulic cylinder 184 is pivotally connected between the shafts 61 on the two pairs of legs and moves the gripping tools 62 apart when it is retracted. The opening movement of the two gripping claws is restricted by the length of stroke of the hydraulic cylinder and by abutments (not shown), the arrangement being such that the lower gripping claw 59 can be rotated through about 60° and the upper gripping claw 60 through about 10°, from closed position. Removal of the trunk from the gripping means is facilitated by the relatively large rotary movement of the lower gripping claw (see the description of the trunk collecting means 25) when debranching of the trunk is completed.

The yoke structure 16 arranged on the beam 11 comprises a box-shaped bracket member 63 divided into three compartments (see also FIG. 7). On the outwardly facing surface of the bottom of the box-shaped bracket member is securely attached a slide plate 64 and a journal pin 65 securely attached thereto. A slide plate 66 is rotatably arranged on the slide plate 64, the journal pin 65 passing into a bearing 67 in the slide plate 66. On the outwardly facing flat surface of the slide plate 66 are attached two supports 68. The slide plates are held together by means of a washer and two nuts, which are screwed securely on the journal pin, so that the slide plate 66 is able to turn around the pin. A fork-shaped attachment member 69 is securely mounted in the free end of the beam 11. The two limb members of the attachment member are connected together by means of a shaft 70, which also extends through bearing bushings in the supports 68. Between each support 68 and corresponding limb member of the attachment member 69 is arranged a link system, which comprises two links 71, 72, which at the ends thereof are pivotally connected with each other, the support and the attachment member, The connecting link between the links is for both link systems a common shaft 73. It is evident from the described construction that the yoke 16 is mounted pivotally in the bearing 67 and for rotation around the shaft 70. Rotation of the yoke is effected by means of two hydraulic cylinders 74 and 75, of which the hydraulic cylinder 74 is pivotally connected between the beam 11 and the shaft 73 interconnecting the link system, while the hydraulic cylinder 75 is pivotally connected between the bracket member 63 and a lever arm 76 securely mounted on the slide plate 65. The hydraulic cylinders are connected to the valve box 50 and the oil container 33 on the feed carriage 23 by means of the high-pressure tubes 53 in the beam 11 and the hose connections 52 connected thereto.

As will be seen from the following, the box-shaped opening on the yoke is always turned towards the tree while the tree is being processed irrespective of whether the tree is standing or fallen. To facilitate the continued description of the apparatus these positions of the yoke are called in the following the tree cutting or severing position and the debranching position respectively. As previously mentioned, the cutting means 17, the gripping means 19, the cutting means 18 and the debranching means 20 are arranged at the forward end of the beam 11. These means are supported by the yoke structure 16 and are mounted in the compartments of the bracket member 63 in said order from beneath with the yoke in cutting position (the yoke vertical). The aforementioned means will also be described individually in this order.

The cutting means 17 is primarily intended to sever the upstanding tree, but can also be used to cut the tree into shorter length subsequent to it being felled. This is effected during the debranching sequence if the length of the tree is such that it cannot be debranched during one single-feed stroke of the feed carriage 23 (a more detailed description is given in the following). The debranched portion of the tree trunk is severed by the cutting means when the feed carriage has reached the end of the feed stroke. When this position is reached, the gripping means 24 of the feed carriage is caused to release the debranched portion of the trunk, whereafter said portion is moved to one side and the feed carriage carries out its return movement, until the gripping means can grip about the end of the remaining portion of the trunk and debranching is continued.

The cutting means (see FIGS. 8 and 9) comprise two identical cutters 77 and 78, are supported by a bracket member 79, which is movable on the yoke 16 in a direction transversely of the cutting direction. Each cutting member comprises a saw guide plate 80 and an angular holder 81, which are connected together and which together form a triangular unit, along the edges of which an endless saw chain 82 is driven. The saw guide plate 80 comprises a guide plate constructed in a manner conventional in normal motor saws and having a longitudinal recess 83 at one end, a rotatably journaled bridle wheel or direction changing wheel 84 at the other end and having grooves along the longitudinal extending edges for guiding the saw chain. The saw guide plate is symmetrically designed so that it can be turned to permit alternate use of the grooves with thought to the wear and tear thereon. The shaft 85 of the bridle wheel 84 extends from the bridle wheel in both directions and is provided with a circular groove 86 on either side of said wheel. The holder 81 comprises two identical halves connected together so as to coincide shapewise with each other and are held apart at a distance somewhat larger than the width of the saw chain 82. Each half of the holder is provided at one end with a recess 87, while the holder at the apex of the angle and at the other end is provided with a bearing bore 88 and 89 respectively. The saw guide plate is mounted on the holder between the halves thereof, the shaft 85 being fixed to the holder axially by the recess 87 which fits into the grooves 86 in the shaft. Each recess 87 is provided with a rotatable locking catch 90, which can be locked securely transversely over the recess by means of a locking bolt 91, and thereby prevents the shaft from being moved along the recess. The saw guide bar is retained at the holder at the opposite end by a shaft 92, which extends through the recess 83 in the saw guide bar and is attached to the halves of the holder at its ends. The holder is pivotally arranged on a shaft 93, which is rotatably mounted in the bore 89 in the holder and in the bracket member 79. A drive wheel 94 is keyed onto the shaft 93 between the holder halves. The shaft also carries a chain wheel 95, which is keyed on the shaft adjacent the bearing thereof in the bracket member 79. A toothed segment 96 is screwed onto the holder surface facing the bracket member 79, so that the centerlines of the segment and the shaft 93 coincide. A shaft 97 is rotatably mounted in the bore 88 in the holder. The shaft 97 is provided at one end thereof, which projects outwards slightly from the holder, with a securely mounted sector arm 98. A roller 99 is eccentrically keyed on the shaft 97 between the holder halves and forms the shaft of a bridle wheel 100 rotatably mounted on the roller. The saw chain 82 is drawn in an endless path between the driving wheel 94 and the two bridle wheels 84 and 100, and is guided by the groove along the outwardly facing edge of the saw guide plate 80. The tension in the saw chain is regulated by means of the sector arm 98 and the shaft 97. When the arm and the shaft are rotated, the bridle wheel 100 is moved by the eccentric roller 99 in the direction corresponding to the position of the roller and the direction of rotation.

When the saw chain has in this way been slackened sufficiently, it can readily be removed from the cutting unit without any other action being required. When the tension in the chain has been regulated, the shaft is locket in the set position by means of a clamping bolt 101, which when tightened clamps the sector arm 98 to the holder.

The described cutters 77 and 78 are arranged in relation to each other on the bracket member 79 so that the toothed wheel 95 and the toothed segment 96 on respective cutters intermesh. A hydraulic cylinder 107 is pivotally connected between the holders 81 of the two cutting means and when activated rotates the same around the shafts 93. As a result of the engagement between the gear segments and of the position of the hydraulic cylinders between the cutters, the cutters will be rotated synchronously with one another and in opposite directions. A hydraulic motor 108 is securely mounted in the bracket member 79 for driving the saw chains 82. The rotary movement of the motor is transmitted to the saw chains via a gear wheel 109, which is attached to the motor shaft and which is located in engagement with the gear wheel 95 of one of the cutting means 77, 78.

When a tree is to be severed, the two cutting means 77, 78 are rotated apart as far as possible. In this end positions thus taken by the cutting means, the cutters are completely collapsed in the bracket member 79, thereby being prevented from coming into contact with the tree when the tree or the yoke 16 are maneuvered into cutting position. When the tree is in cutting position between the cutting means, the saw chain motor 108 is started, whereupon the saw chains start to move. The hydraulic cylinder 107 is then retracted so that the cutting means are rotated towards each other and the saw chains come into contact with the tree on either side thereof. Upon continued retraction of the hydraulic cylinder, the tree is cut by the saw chains in a conventional manner, working the tree simultaneously as they are moved towards the center thereof. When the hydraulic cylinder is completely retracted, the facing portions of the saw chains are substantially parallel and the cutting sequence terminated. To prevent the saw chains from contacting each other at this stage of the working sequence and to enable the cuts made on opposite sides of the tree to meet, the engagement between the gear wheels 95 is such that the teeth of the saw chains are displaced one-half pitch in relation to each other. In this way, the saw chains at the final stage of the cutting sequence are driven staggered with each other.

The bracket member 79, on which the cutting means 17 is mounted, is, as previously mentioned, capable of moving on the yoke 16 parallel with the direction in which the tree is fed. To these ends, the bracket member is provided with two cylindrical rods 112, 113. These rods are capable of sliding in their longitudinal direction in two tubular guide structures 114, 115 on the yoke 16 and extend through the opposite end of the guides. In each guide a pressure spring 116, 117 is tensioned between a shoulder on the rod and an end piece on the guide, whereby the springs attempt to move the bracket member 79 outwardly from the yoke 16. The outward movement of the bracket member from the yoke is restricted by the shoulder at the free end of the rods, which in the end position lie against the end piece of the corresponding guide. Movement of the bracket member in the opposite direction (against the spring) is restricted by contact with the yoke 16. A spring biassed pawl 118 is mounted for rotation on the yoke so that when in active position it bears against a shoulder 119 on the bracket member 79 and prevents it from moving against the force of the pressure springs 116, 117. A thrust stud 120 is secured to the under side of the beam 11. When the yoke 16 is rotated from cutting position to debranching position, the thrust stud 120 bears against the pawl 118 and initiates its locking action. The reason for this and the reason why the cutting means 17 is movable on the yoke 16 will be evident from the following.

The gripping means 19 is intended to hold the standing tree when it is cut and when it is felled after cutting. The gripping means comprises two gripping claws 121 and 122 arranged in a conventional manner (see FIG. 10). The gripping claw 121 is provided with teo limb members arranged pairwise and between which the gripping claw 122 is inserted when the gripping claws are closed. Each gripping claw is keyed on a shaft 123, 124, which in turn is rotatably journaled in bearings 125, 126 mounted on the bracket member 63. A hydraulic cylinder 127 is rotatably mounted in the bracket member 63 at the free end of the cylinders and the piston rod is pivotally secured to a link 128 keyed on the shaft 124. The link 128 extends in the opposite direction to the gripping claw 122 and forms therewith a double-arm lever. When the piston rod of the hydraulic cylinder is moved, the gripping claw 122 is rotated by the link 128 and the shaft 124. Two wheels 129, 130 are keyed on each shaft 123, 124. The wheels 129 and 130 respectively are connected together by means of two chains 131a, 131b, which are passed between the wheels in the form of two inverted S:es and secured thereto at their ends. When the hydraulic cylinder is activated, the movements of the piston rod is transmitted to the two gripping claws, so that these are rotated synchronously with each other and in opposite direction.

The cutting means 18 is arranged on the yoke 16 in the same compartment in the bracket member 63 as the debranching means 20 and between said means and the gripping means 19. The cutting means is adapted to come into operation automatically and to sever the tree at a certain minimum diameter of that portion of the tree which is located during the debranching operation between the gripping claws 153, 154 of the debranching means (see the debranching means below). The cutting tool comprises a sharp-edged knife 132, which is connected to the gripping claws 153, 154 and is operated by said claws (FIGS. 11 and 12). To these ends, two links 133, 134 are keyed on the rotation shafts 157, 158 of the gripping claws so as to form a double-arm lever with respective gripping claws. The knife 132, which extends transversely of the direction, in which the tree is moved through the debranching means, is keyed on a shaft 135, which extends transversely of the feed direction, so that when in an inactive position the knife is located above the tree with the edge facing in the feed direction. The shaft 135 is pivotally mounted in a support 136 securely attached to the bracket member 63, and supports an angular link 137, which is keyed on the shaft and which together with the knife forms a double-arm lever. A wire 138 is attached to the link 137 and is passed therefrom to two pulleys 139, 140 mounted on the bracket member. The wires are passed from the pulleys through an eye 141 mounted in the link 133. A stop plug 142 is screwed in the end of the wire, the stop being formed so as to prevent withdrawal of the wire from the eye. A tension spring 143 is connected between the bracket member 63 and the link 137 and endeavors to rotate the link and the knife 132 clockwise around the center of the shaft 135 (see FIG. 11). Rotation of the link and the knife is restricted by a stop member 144 attached to the support 136. Arranged adjacent the upper limb member 137a of the link 137 is a latching means 146. The latching means incorporates a guide member 147 attached to the bracket member 63, in which guide an elongated catch member 148 is movable in its longitudinal direction between two end positions. A compression spring 149 is tensioned between the guide and the shoulder on the catch and attempts to move the catch into the movement path of the limb member 137a. The catch is designed at this end so that the limb member 137a can pass the catch in its upward movement but is obstructed by the catch on its downward path. The catch is provided at its opposite end with an eye 150 through which passes a wire 151. The wire 151 is fastened at one end to the link 134 and at the other end is provided with a stop plug 152. The stop is constructed so that the wire cannot be pulled from the eye. The length of the wires 138 and 151 are so adjusted that the limb member 137a has passed the catch 148 and the major portion of the wire 151 projects from the eye 150 when the gripping claws 153, 154 are in their open end position.

The cutting means 18 operates in the following manner. When the gripping claws 153, 154 of the debranching means are moved apart from their closed position so as to enable the tree to be debranched to be brought therebetween, the catch 148 is moved by the spring 149 into the path of movement of the limb member 137a, while the wire 151 projects out from the eye 150 in the catch. At the same time the link 133 is turned clockwise by the shaft 157, whereupon the eye 141 on the link reaches engagement with the stop plug 142 and, via the plug and the wire, turns the link 137 and the knife 132 counterclockwise about the center of the shaft 135. During this rotary movement, the limb member 137a is drawn upwards, against the action of the tension spring 143, and beyond the catch 148, while the knife 132 is lifted away from the area in which the tree is located during the debranching operation. When the limb member 137a passes the catch 148 during its upward movement, it temporarily moves the catch to one side against the tension of the compression spring 149, via the arcuate portion of the end of the catch. When the tree has been moved into the debranching position between the gripping claws 153 and 154, the claws are closed on the under side of the tree. The links 133 and 134 are then turned so that the knife 132 and the limb member 137a, under the action of their own weight and under the influence of the tension spring 143, are rotated about the shaft 135 until the limb member bears against the catch 148. At the same time, the wire 151 is drawn in through the eye 150 so that the distance between the eye and the stop plug 152 decreases. During the debranching operation, the tree is pulled root end first through the debranching means, while the two gripping claws 153, 154, which are under constant pressure from two hydraulic cylinders 166, 167, are moved together beneath the trunk of the tree to an extent corresponding to its degree of taper towards the top end. Upon such rotation of the gripping claws, the distance between the stop plug 142 and the eye 141 increases, while the wire 151 is drawn in through the wire 150 until the stop 152 reaches engagement therewith. When the gripping claws 153, 154 during the continued debranching operation progressively approach each other as a result of the conicity of the tree, the end of the wire 138 becomes more distant from the eye 141, simultaneously as the catch 148 is successively drawn in by means of the wire 151, away from the limb member 137a, so that a progressively smaller portion of the catch is located beneath the limb member. When the portion of the tree trunk located between the gripping claws has reached a specific predetermined minimum size and the gripping claws have been moved together to a corresponding degree, the catch releases contact with the limb member 137a. The link 137 and the knife 132 are then turned under the action of their own weight and by the spring 143 rapidly clockwise around the shaft 135, until the knife comes into contact with the tree. As a result of the movement of the tree in the feed direction and the setting of the knife 132, with the edge obliquely downwards (forwards) towards the feed direction, the knife when coming into contact with the tree is forced positively into the tree and cuts the same with a cut directed obliquely to the longitudinal direction of the tree. When the trunk has been severed, rotation of the knife is stopped as the link 137 comes into contact with the stop shoulder 144. The gripping claws are then moved apart so that the remaining top end of the tree falls to the ground.

The stop plug 152 is so formed that it can be released from the wire 151 and secured at varying distances from the wire end. In this way the catch 148 can be made to release the limb member 137a and activate the knife at different dimensions of the portion of the tree embraced by the claws. The stop plug 142 can also be screwed fast at different distances from the corresponding wire end. The reason for this is that it should be possible to compensate for changes in the relative movement between knife 132 and gripping claw 153, said changes being the result of stretch in the wire 138. It is of course also possible to obtain the same adjusting effect by clamping the stop plugs to the wires and to design the eyes 141, 150 so that they can be moved on respective links instead.

The debranching means 20 comprises two identically constructed, rotatably arranged gripping claws 153, 154 and a chainlike debranching tool 155, 156 (see FIGS. 13 and 14). Each gripping claw is keyed to a shaft 157, 158, which in turn is rotatably mounted in the bracket member 63. A flanged distance sleeve 159, 160 is loosely mounted on each shaft. The distance sleeves are arranged on opposite sides of the gripping claws, whereby said claws are mutually displaceable and meet in a scissorlike movement when they are closed. Securely mounted on each shaft is also a link 161, 162 and two wheels 163a, b and 164a, b respectively. The links 161, 162 extend from the shafts 157, 158 in opposite directions towards the gripping claws 153, 154. The debranching tools 155, 156 each comprise an elongated debranching chain constructed in a conventional manner and which at one end thereof is securely mounted on the gripping end of one of the gripping claws 153, 154 (for illustrative purposes the debranching tool has been omitted in the embodiment illustrated in FIG. 13). The debranching chains are passed from respective gripping claws in a direction towards the axes of rotation of one gripping claw, around the distance sleeve thereof for approximately one-half turn and then back to the link of the first-mentioned gripping claw, in which link it is secured by means of a tension spring 165a, 165b. By means of the tension thus provided, the debranching chains are held stretched over the distance sleeves irrespective of the position of rotation of the gripping claws. Because each debranching chain is tensioned between the arms of the double-arm lever formed by the interconnected gripping claws and link, the stretching movements of the tension spring are slight. This means that variations in the tension of the debranching chains are also slight, which is of great importance to the useful life and debranching ability of the chain. The gripping claws 153, 154 and the debranching chains 155, 156 are operated by means of two hydraulic cylinders 166, 167, which are pivotally connected between the bracket member 63 and the links 161, 162. When the hydraulic cylinders are activated, the gripping claws are rotated by the cylinders via corresponding links and rotation shafts. For the purpose of synchronizing movements of the gripping claws, the wheels 163a and 164a and 163b and 164b respectively are interconnected by means of two chains 168a, which are passed between the wheels in the form of two inverted S:s attached thereto at their ends.

Cutting and felling of the standing tree and debranching (with optional intermediate severing of the tree at certain maximum lengths thereof) and topping of the tree is effected in one continuous working sequence in the following manner:

Subsequent to maneuvering the machine into position relative to the tree to be processed, the frame structure 2 and the jib 6 are turned to face towards the tree, while the beam 11 is extended until the yoke 16 is located some distance from the tree (FIG. 1). The jib 6 is then swung so that it points towards the root end of the tree, simultaneously as the yoke 16 is rotated into cutting position and the saw guide plate and gripping claws of the cutting means 17 and holding and debranching means 19 and 20 are moved fully apart. In this position of the yoke 16, the cutting means 17 is projected from the yoke and is held in this position by the catch 118 (see FIG. 9). The beam 11 is extended further towards the tree, until the arcuate portion of the bracket member 79 bears against the tree trunk, whereupon the gripping claws of the holding and debranching means are closed around the trunk. The tree is now severed with a cut adjacent the surface of the ground in the manner previously described (cutting means 17). After the tree has been cut, the beam 11 is retracted into the beam 10, simultaneously as the two saw guide plates are parted and the yoke rotated to its debranching position while the tree is held securely by the gripping means 19 and the debranching means 20 some distance from the root end. Since the beam 11 and the feed carriage 23 move synchronously with one another and in opposite directions, the feed carriage will be located in its forward end position when the beam 11 is completely withdrawn into the beam 10. At the final stage of the felling movement of the yoke 16, the thrust stud 120 on the beam 11 will come into contact with the catch 118 of the yoke 16, causing the locking action of the catch of the bracket member 79 of the cutting means 17 to cease (see FIG. 7). The stop shoulder 145 mounted on the beam 10 can then move the bracket member and the cutting means inwardly of the yoke at the final stage of the movement of beam 11, whereupon the root end of the tree is accessible to the gripping means 24 of the feed carriage (FIGS. 6 and 9). The beam 11 is now fully telescoped in the beam 10 while the yoke 16 is in its debranching position and the feed carriage 23 in its forward end position with the gripping claws 59 and 60 open and located on either side of the root end of the tree. The larger portion of the tree rests on the ground while the tree is held by the gripping means 19 and the debranching means 20 some distance from the root end. The gripping claws 59 and 60 are now closed around the root end of the tree at the same time as the gripping claws of the gripping means 19 are opened, whereafter the feed carriage is driven towards its rear end position and the beam 11, and therewith the debranching means closed around the trunk, are moved in the opposite direction. The branches and knots are then severed from the trunk in the manner previously described (debranching means). While the tree is being debranched the parted saw guide plates are completely collapsed in the bracket member 79, thereby being prevented from coming into contact with the tree. The debranching stroke is completed when the feed carriage 23 and the beam 11 have reached their respective end positions. The feed carriage and the beam have then been moved a total distance of, in the exemplary embodiment, 18 m, which also constitutes the length of the portion of the tree which during the debranching stroke has passed through the debranching means 20. If the portion of the tree trunk located between the gripping claws of the debranching means during the debranching stroke has not reached the predetermined minimum diameter, at which the topping means 18 automatically comes into operation, the trunk is severed by the cutting means 17, which at the beginning of the debranching stroke releases contact with the stop shoulder 145 and is again moved outwardly from the yoke 16 by the springs 116, 117. Subsequent to severing the trunk, the cut and debranched trunk portion is moved transversely onto the loading structure of the collecting means 25 (see the collecting means). That portion of the trunk which has not been debranched can now either be released to the ground or debranched, depending on its length and size. If the latter alternative is chosen the sequence of operations is that previously described. When the portion of the trunk embraced by the gripping claws of the debranching means has reached the minimum diameter during the debranching operation, the topping means 18 begins to operate and severs the trunk (see the cutting means 18). Although in the exemplary embodiment the length of the beam is approximately 11 meters it is possible to shorten or lengthen the beam without departing from the purview of the invention. The length of the beam chosen, and thereby also the length of the debranching path, is dependent, however, on the anticipated length and size of the trees upon which it is expected to work and the conditions etc. under which the machine is to operate.

When a trunk has been debranched and released from the debranching means, with or without the assistance of the cutting means 17, 18, it is moved to the collecting means 25. The collecting means is mainly comprised of three holders 170, 171 and 172 arranged on the frame structure 2, and of which the two first mentioned are identical in design (see FIGS. 1 and 4). The holders 170 and 171 are mounted on the rear portion and center portion respectively of the frame and each comprises a forked bracket member 173 (see FIG. 5 and 16) which is welded to the frame structure 2 at a somewhat lower level than the lower gripping claw 59 of the feed carriage 23. The bracket member extends on the frame transversely of the beam 10 and is provided at its outer end with a horizontal journal pin 174 arranged on each leg member. Arranged on the journal 174 are two pairs of beams 174, rotatably journaled at one end thereof. The beams 175 are joined at their free end by means of a horizontal shaft 176, about which a double-arm lever 177 is pivotally mounted. The beams 175 and the lever 177 are provided with stop shoulders (not shown), which restrict rotation to 120 and 90 degrees respectively. FIG. 16 shows by means of chain lines the end positions of the beams and the lever (the lever being shown in one end position also by full lines). To effect rotation of the beams and the lever there is pivotally connected between the frame member 2 and one of the arms of the lever a hydraulic cylinder 178. When the hydraulic cylinder is completely withdrawn, the beams and the lever are located in their counterclockwise rotated end position, when the hydraulic cylinder is fully extracted from this position, the first lever is rotated to its clockwise rotated end position, in which corresponding stop shoulder on the lever bears against the beams. Upon such continued extension of the hydraulic cylinder, the beams are rotated via the lever arm to their clockwise rotated end position. When the hydraulic cylinder is retracted, the movements take place in reverse order. The reason for this move or operation will be explained below.

Mounted at the inner end of the bracket member 173 is a horizontal shaft 179, on which a flap 181 is pivotally mounted. Beneath the flap 181 and the frame structure 2 is mounted a tension spring 182, which endeavors to turn the flap clockwise about the shaft 179. The flap is rotatable through about 30°, between two end positions and, to these ends, is provided with a fixed stop shoulder, which during rotation of the flap moves between two shoulders on the bracket member 173 (the stop shoulders and the abutments not being shown in the figures). In the counterclockwise rotated end position in the Figure, the upwardly extending corner of the flap is rotated at a somewhat lower level than the upper edge surface of the bracket member 173, while the same corner in the other end position of the flap is located at a somewhat higher level than the bracket (the Figure shows the flap in this latter position).

The holder 173 (see FIGS. 2 and 7) is mounted on the forward portion of the frame structure 2 and is carried by two identical, obliquely upwardly extending support members 185, which are welded to the frame structure at a small distance apart (only one support member being shown in FIG. 2). Each support member is provided at its upper end with a horizontal journal 186. Two beams 187 arranged in pair are pivotally journaled at one end on the journals 186. At their free end beams 187 are joined by means of a horizontal shaft 188, about which a double-arm lever 189 is pivotally mounted. A hydraulic cylinder 183 is pivotally secured between one of the arms of the lever and the frame structure 2 and adapted to turn the lever arm 189 and the beams 187. The lever arm and the beams are provided with stop shoulders (not shown) for restricting these movements, which are the same as those described above for corresponding members of the holders 170 and 171. Welded to the upper end of the support member 185, adjacent the journals 186, are two arcuate beams 190, arranged pairwise, which at one end thereof are joined by means of a horizontal shaft 191. An angular double-arm catch 192 is mounted for rotation on the shaft 191. Tensioned between the catch and a shaft 182 joining the support members 185 is a tension spring 193, which attempts to turn the catch clockwise about the shaft 191. The catch 192 is capable of rotating between two end positions and is provided with a stationarily mounted stop shoulder, which, when the catch rotates, moves between two abutments of the beams 190 (the stop shoulder and the abutments are not shown in the Figures). In one end position the upwardly extending corner of the catch member is located at a slightly lower level than the upper arcuate edge of the beams 190 while in the other end position said corner is at a high level and said edge (the figure shows the catch in this latter position).

A further shaft 194 is securely mounted between the support members 185 somewhat below the journals 186. The shaft 194 supports an arcuate bar 195, which is mounted for rotation on the shaft and obtains its movement from a hydraulic cylinder 196 pivotally connected between the bar and the shaft 182. Rotation of the bar 195 is restricted in two end positions by the length of stroke of the hydraulic cylinder. The bar is shown in the Figure by full lines in one end position thereof and with dotted lines in the other end position.

Fixedly attached to the side of the beam 10 remote from the holders 170-172 adjacent the front end of said beam is an angular guide beam 197, the beam being arranged so that one limb member thereof extends beneath the conveying path of the feed carriage 23 and obliquely downwardly. The obliquely extending limb member of the beam 197 thus overlap the arcuate beams 190, when seen in the longitudinal direction of the collecting means. The holders 170-172 are arranged on the frame structure 2 in different planes so that the holder 172 is located at a higher level than the remaining holders and the holder 171 in turn at a higher level than the holder 170. The differences in position of elevation are such that the points of rotation of the beams 175 and 187 of the three holders will lie on a single line through the same.

A loading means 198 for transporting the debranched trunks transversely to the collecting means 25 is mounted on the frame structure 2 between the bracket members 173 of the holders 170 and 171 (FIGS. 5 and 15). The loading means comprises two identical dog or carrier members, each comprising an elongated beam 199 and a tube 200, which which is welded at one end on the beam 199 at right angles thereto. At the opposite end each beam is mounted for rotation about journal 201 vertically attached to the frame structure 2, so that the tube 200 extends vertically upwards from the beam. A toothed segment 202 is secured to each beam 199 so that the centerlines of respective segments and corresponding journal 201 coincide with each other. The two toothed segments intermesh, whereby the beams 199 moves synchronously and in opposite directions when they are rotated about the journals 201. A hydraulic cylinder 203 is pivotally secured between the frame 2 and one of the beams 199. Rotation of the beams 199 is restricted in two end positions by the length of stroke of the hydraulic cylinder. In FIG. 5 the beams are shown in one end position by means of full lines and in the other end position by dotted lines.

The collecting means 25 are ready for use when the loading means 198 and the holders 170-172 have been brought to the position shown with full lines in FIG. 2, 5 and 16. The arrangement functions in the following manner: When debranching of the tree trunk is completed, the trunk falls down from the debranching means 20, with or without the assistance of the cutting means 17 and 18, until it rests on the guide means 197 (FIG. 2) and while it is still held at the root end by the gripping means 24 of the feed carriage. When the feed carriage has reached its rear end position, the gripping claws of the gripping means 24 are opened and the trunk is lowered somewhat at the root end, this end still being supported by the lower gripping claws 59 (see also FIG. 6). The hydraulic cylinders 2 and 3 of the loading means 198 are then withdrawn and rotates the beam 199 around the journal 201. During rotation of the beams the tubes 200 extending vertically from said beams 199 come into contact with the trunk and move it laterally from the rest position of the lower gripping claw of the gripping means 24, causing the trunk to fall therefrom. At the same time the trunk slides crosswise down the sloping limb member of the guide beam 197. At this stage the heavier portion of the trunk is resting on the brackets 173 of the holders 170 and 171 in a position across the flaps 181, which as the trunk falls from the gripping means 24 are rotated anticlockwise (FIG. 16) around the shafts 179 and are held depressed against the spring force of the trunk.

The other end of the trunk rests on the frame structure 2 adjacent the beam 190. Upon continued rotation of the two beams 199 of the loading means 198, the trunk is moved further transversely along the bracket member 173 until the flaps 181 are released by the trunk and can spring upwards on the rear side of said trunk. At the same time the bar 195 of the holder 170 is turned anticlockwise by the hydraulic cylinder 196 (FIG. 2), the trunk being carried by the bar and moved there along the arcuate edge surface on the beams 190. The bar continues to turn until it is in a substantially upright position. As the catch 190 moves, it is rotated by the trunk counterclockwise about the shaft 191, held depressed under the arcuate edge surface of the beam 190. When the trunk has passed the catch completely, the catch is drawn by its spring 193 back to its original position at the rear of the trunk and the bar 195 is returned to starting position by the hydraulic cylinder 196. Subsequent to the flaps 181 and the catch 192 being released by the trunk, the beams 199 of the loading means 198 are turned back to their starting position. The trunk now rests on the horizontal loading surface formed by the bracket members 173 and by the beams 175 and 187, simultaneously as it is prevented by the levers 177 and 189, the flaps 181 and the catch 192 from being moved along this surface.

As the debranching work continues after being debranched, each separate trunk is conveyed onto the holders in the manner described above. While being conveyed in this manner, each trunk pushes the trunk or trunks previously positioned on the holders laterally and forwardly until they are stopped by the lever arms 177 and 189, when the trunks are forced up onto each other in two or more layers.

As previously mentioned, the holders 170-172 are arranged on the frame structure 2 so that the loading plane formed by the bracket members 173 and the beams 175 and 187 are slightly inclined upwardly when seen in the direction of the front end of the frame 2. The reason for this is to prevent the unsupported portion of the trunk, which projects out from the holder 172 and bends down as a result of its weight, from coming into contact with the ground and thereby making it difficult to turn the beams 10 and 11 horizontally. When a suitable number of trunks have been collected on the holders, they are bundled together by the bundling means 26, as described in the following. Bundling is effected with the assistance of coarse iron wire, which is twined around the trunks so as to hold them together. After the trunks have been bundled, the hydraulic cylinders 178, 183 of the holders 170-172 are completely withdrawn, whereupon the beams 175, 187 of the holders and levers 177, 189 are moved to their clockwise rotated end position shown in FIGS. 1, 16 and the bundle of trunks slides from the holders down to the ground, to the side of the machine. Subsequent to tipping the bundle of trunks, the beams and levers are returned to their starting position.

As is evident from FIGS. 2 and 16, the beams 175, 187 associated with holders 170-172 can also be rotated to a vertically upstanding position. The reason for this is to reduce the width of the machine and render it more maneuverable in the terrain and on the roads.

The bundling means 26, by which the trunks conveyed to the collecting means 25 are bundled together, it is arranged on the machine between the beam 10 and the collecting means 25 (FIG. 17 and 18). The main components of the bundling means include a guide passage 204 mounted on the beam 10, a rotatably mounted reciprocating wire guiding or manipulating means 205, also mounted on beam 10, and a rotatable double-arm motor 206 mounted for axial movement on the frame 2. A coarse iron wire 207 is drawn through the guide passage 204 and passed to the wire guiding or manipulating means 205, whereupon with the assistance of the means 205 and the rotor 206 the wire is wound about the trunks located on the trunk-collecting means 25. The iron wire is passed to the guide passage 204 from a supply reel 208 loosely journaled on the opposite side of the beam 10. The supply reel is provided with an easily applicable friction brake (not shown). The guide passage comprises a tube open at both ends and extending from the supply reel transversely across the beam 10 to the wire guiding means 205 situated on the opposite side of the beam. The end of the guide passage adjacent the supply reel 208 has a rectangular cross section with gently rounded edges and corners, while the passage in general narrows progressively towards the opposite end thereof and transforms at the mouth thereof adjacent the wire guiding means 205 into a circular shape with a diameter somewhat larger than the diameter of the iron wire. The wire guiding means 205 is mounted on a bracket member 209 attached to the beam 10 adjacent the guide passage 205 and is located at such a distance from said passage that the free end of said means during its swinging movement passes immediately adjacent the mouth of the passage (see also FIG. 15). The wire guiding means is provided at its free end with a downwardly extending stationary gripping claw 210 which presents a wedge-shaped gripping portion. Between the wire guiding means and a bracket member 211 mounted on the beam 10 there is pivotally mounted a hydraulic cylinder 212, which is adapted for driving the wire-guiding means. Beneath the wire guiding means and the guide passage is a boxlike elongated bracket member 213, this bracket being mounted to the frame structure 2 slightly beneath the upwardly facing surface of the frame. Mounted on the outwardly facing long side of the bracket member 213 is a rotatable and axially movable shaft 214, which extends from its bearing in both directions. The rotor 206 is securely keyed to the shaft on its outwardly extending end. The rotor is provided on each end thereof with a stationary gripping claw 215, 216, which presents a wedge-shaped gripping portion whose wedging angle is somewhat less than the wedging angle of the gripping claw 201 of the slew arm. At the pointed portion of the grip of the gripping claw 215 and on the side facing the bracket member 213 the edges of the grip are ground to form a cutting edge 217. The shaft 214 is provided on the inside of the bearing in the bracket member with splines, on which a gear wheel 218 is able to move. The gear wheel is provided with an elongated tub 219 in which grooves 220 extending parallel with the shaft are located. A rack 221 is arranged above the gear wheel 218 and in engagement therewith. The rack at its front end is pivotally connected to a yoke 222, which extends transversely across the bracket member and is movable crosswise along two guides 223 mounted on the long sides of the bracket member 213. A slide surface 224 is securely mounted obliquely in the vertical plane on the yoke 222. A pressure spring 225 is tensioned between the bracket member 213 and an abutment 226 on the shaft 214 and endeavors to move the shaft against the slide surface 224. The yoke 222 is securely connected to the piston rod of a hydraulic cylinder 227, the cylinder of which is attached to the front end wall of the bracket member 213. When the hydraulic cylinder 227 is activated, the yoke 222 and the slide surface 224 are moved in the longitudinal direction of the bracket 213. Since the shaft 214 is held against the slide plane 224 by spring force and since the slide surface of said plane is obliquely positioned the shaft is moved axially when the slide plane is moved. The angle which the slide surface forms with the shaft and the length of the shaft are so adapted that the rotor 206 at the end of the shaft can be moved between an outer and an inner end position situated on either side of the rotation plane of the wire-guiding means 205. In the outer end position, the rotor is located immediately adjacent the rotation plane of the wire-guiding means with the gripping claw 215 extending upwardly and the gripping claw 216 downwardly, while in the inner position the rotor is moved approximately 5 cm. from the rotation plane and the gripping claw 215 faces downwards and the gripping claw 216 upwards. Mounted between the long sides of the bracket member 213, above the rack 221, are two beams 228, which in turn carry two guide rails 229 of angular cross section. The guide rails, which extend parallel with the rack 221 and immediately above the same, are provided at the rear horizontal portion thereof with a recess 230 in which a flap 231 is mounted for rotation. Under the influence of its own weight, the flap attempts to rotate and adopt an obliquely downwardly/rearwardly directed position in which it rests against a shoulder 231a. A spring biassed thrust stud 232 is securely mounted to the front end of the guide rail 229 so as to bear against the rack and endeavor to hold it pressed against the toothed wheel 218. Above the rack and in its rear portion is welded a journal pin 233. The journal pin, which is somewhat shorter than the width of the recess 230, extends transversely across the rack equidistantly on both sides. Two levers 235, 234 are pivotally mounted on the bracket at the ends of the guide rails and somewhat below the same. Each lever is provided at its downwardly extending portion with an elongated recess. The upper portion of the lever 234 projects in between the guide rails, while the upper portion of the lever 235 is turned somewhat laterally in towards the rack. A longitudinally extending catch 236 is movably arranged in its longitudinal direction on the bracket in a manner whereby it can be moved into the groove 220 in the hub of the toothed wheel when the groove is turned towards the catch.

The mode of operation of the bundling means is as follows. When the rack 221 has been moved to the forward end position (the hydraulic cylinder 227 is completely retracted) and the rotor 206 has therewith been moved to its outer position with the gripping claws 216 facing downwardly, the friction brake is removed from the supply reel 208. The end of the iron wire is then drawn from the supply reel into the adjacent opening of the guide passage 204, and passed into the guide passage until it projects out through the mouth thereof adjacent the wire guiding means 205. The wire is then drawn from the guide passage, down to the gripping claw 216 of the rotor 206, in which it is securely clamped. The wire-guiding means 205 is then rotated by means of the hydraulic cylinder 212 to its upper turning position, while the supply reel 206 is rotated by means of a hand crank, specially arranged for the purpose, so as to stretch the wire between the supply reel and the guide passage and between said passage and the rotor. When sufficient tension has been applied to the wire, the friction brake is applied to the supply reel. Since the wire is now stretched between the loading surface of the collecting means 25 and the longitudinal conveying path of the tree trunks, the debranching work can begin. When the trunks, having been debranched, are conveyed in their longitudinal direction to the collecting means, the wire is carried by the trunks. In the meantime, wire is unwound from the supply reel 208 at the same time as the tension is maintained in the wire by the action of the friction brake against the reel.

When a suitable number of trunks has been collected on the loading surface, the debranching work is interrupted, whereafter the wire-guiding means 205 is turned from its upper turn position. When the gripping claw 210 of the wire guiding means then passes the opening of the guide passage 204, it grips the portion of the wire projecting from the mouth of said passage and moves the wire down towards the upwardly extending gripping claw 215 of the rotor 206. Upon continued rotation, the gripping claw 210 of the wire-guiding means passes immediately adjacent and on the inside of the gripping claw 215 of the rotor and passes the wire into the claw. Since the angle of the wedge-shaped grip of the gripping claw 215 is smaller than the angle of the wedge-shaped grip of the gripping claw 210, the wire will be clamped much more strongly in the rotor than in the wire-guiding means. Shortly before the wire-guiding means reaches its lower turn position, the wire comes into contact with the edge 217 on the gripping claw 215 and is severed thereby. At this stage the wire drawn around the bundle of wood is held at its ends by the rotor 206. The wire-guiding means, which constantly holds the wire issuing from the guide passage, is now rotated upwardly until it is free from the rotor and permits the same to rotate. The hydraulic cylinder 227 is then extended, whereupon the rack 221 is moved rearwardly and the shaft 214 and the rotor 206 are caused to rotate in a clockwise direction (FIG. 17). As the rotor rotates, the portions of wire extending from the rotor are wound together, whereby the wire is drawn tightly around the wood bundle. When the tension in the wire has reached a certain predetermined value, which for example depends upon the flexibility and elasticity of the wire and the wedge effect of the gripping claw of the rotor, the wire is automatically drawn from the gripping claws. If the wire is too firmly gripped in the claws it may occur, however, that the wire does not release from the claws during the winding movement. Should this happen, the wire is drawn from the claws when the bundle of wood is tipped from the loading surface (see the collecting means) as a result of the greater weight of the wood.

If the wire is not sufficiently tensioned around the wood bundle, despite the fact that the rack 220 is moved back to its rear end position and the rotor 206 thereby ceases to rotate, the rack is moved out of engagement with the toothed wheel 218 and then to its forward end position, where it is moved again in engagement with the wheel and again causes the wheel to rotate. This function takes place automatically in the following way, subsequent to being initiated by the operator. When the rack 221 during the winding movement is moved from its forward end position to its rear end position its journal pin 233 slides in the cross direction thereof along the lower portion of the guide rails 229 and passes the flap 231 resting against the shoulder 231a. During passage of the flap, the flap is moved to one side by the journal pin but retakes its rest position against the shoulder when coming out of contact with said pin. The rotary movement of the flap has in this instance no role to play. If the wire is too loosely drawn around the wood bundle when the rack has reached its rear end position, the operator initiates continued winding of the wire. The rack then makes an inoperative forward return stroke. Shortly after the rack has left the rear end position, the journal pin 233 again comes into contact with the flap 231. This time, however, the flap has such a position in relation to the journal pin that during the continued forward movement of the rack the pin is moved up on the flap and in on the upper side of the horizontal portion of the guide rails 229. Since the journal pin is securely connected to the rack, the rack is thus drawn out of engagement with the wheel 218 while simultaneously being rotated about the connecting link in the yoke 222. The distance through which the rack is moved from the rear end position to the moment when it is lifted out of engagement with the toothed wheel is so adapted that the groove 220 in the hub of the toothed wheel in the lifting moment is facing the groove 236 simultaneously as the rotor 206 is horizontal with the gripping claw 215 turned upwards, When the rack is lifted, the rear portion thereof engages the horizontal link member of the lever 234, thereby rotating the lever, and the catch 236 is pressed into the groove 220 in the hub. While the toothed wheel 218 is prevented by the catch 236 from rotating, the rack is drawn forward by the hydraulic cylinder in a position oblique to the direction of movement and with the journal pin 233 sliding over the horizontal portion of the guide wheels 229. Since the shaft 214 and the toothed wheel 218 are movable axially in relation to each other, the shaft is moved by the slide plane 224 outwardly through the wheel. Immediately before the rack has reached its forward end position, the journal pin 233 slides over the front edge surface of the guide rails 229, whereupon the rack, as a result of its own weight and pressure from the thrust stud 232, falls down into engagement with the toothed wheel. During this movement the rack rotates the lever 235 connected with the catch 236 so that the catch is moved by the lever out of the groove 220 in the hub and the lever 234 is returned to the starting position. The return stroke is therewith terminated and the rack is ready to rotate the toothed wheel and the rotor in the winding direction. The described working cycle can then be repeated any number of times, until the tension in the wire drawn around the wood bundle is sufficiently great. It is not necessary that the wire is drawn around the bundle of wood to such an extent that the bundle obtains a more or less round cross section, but that the purpose of the bundling is merely to keep the trunks bundled together when they are tipped from the machine, thereby facilitating subsequent transport.

Before debranching is restarted, the end of the wire, which is still held by the wire-guiding means 205, is passed into the gripping claw 216 from the rotor. This takes place so that the rack is moved to its rear end position, in which the rotor is horizontal with the gripping claw 216 facing upwards and located within the turning plane of the wire-guiding means at some distance therefrom. The wire guiding means is then turned downwards so that the wire is moved into the gripping claws 216. Since the gripping claw of the wire-guiding means does not pass immediately adjacent the rotor 206 and the gripping claw 216 lacks a cutting edge, the wire is not severed when the gripping claw 210 passes the gripping claw 216 but is only bent between the same. When the wire has has been drawn securely in the gripping claw 216, the wire-guiding means is rotated back to its upper turn position. Owing to the fact that the gripping claw of the wire-guiding means has a slighter wedge effect than the gripping claw 216, the wire-guiding means will thus release the wire. When the rack is returned to its forward end position, the arrangement is then ready for bundling together a new collection of trunks.

A plurality of modifications of the invention are conceivable within the scope of the inventive idea. From the aspect of use these are, in a number of instances, equivalent with the embodiments described in the example above. In other instances, however, they are less suitable than the exemplified embodiments, although fully usable. These modification will be described in the following without reciting any particular sequence.

In the exemplary embodiment, the machine is provided with a separate source of energy for operating the different handling and working units. It is not necessary, however, to provide a separate source of energy, since the propelling machinery of the apparatus can be used for this purpose. The embodiment having a separate source of energy is to be preferred, however, since it is possible thereby to use the vehicle connected to the machine for forward driving. Another advantage with a separate source of energy is that the wiring is shorter and less space consuming. In the described embodiment it is also conceivable to use the generator or pump arranged on the frame structure 2 for forward driving purposes and connected to one or more electric motors or hydraulic motors, which in turn are connected to the forward drive shafts of the machine.

Neither is it necessary to provide the support structure of the machine, as illustrated in the example, with six wheels, but that any number of wheels may be used. To increase the maneuver ability on the machine in the terrain, it is also possible to adapt the propelling motor to drive all the wheels of the support structure and/or to fit said structure with tracks. It is also possible to provide coupling means between the hydraulic pumps and their drive motors, so that the motors can be disconnected from the pumps during the start period. The advantage with this is that the resistance to starting offered by the cold and thick oil in the pumps is eliminated.

In an alternative embodiment of the invention the hydraulic cylinder 34, 35 and chains 41, 42 intended for rotating the frame structure 2 can be replaced by a gear ring mounted on the frame structure and a hydraulic or electric motor provided with a pinion, the motor rotating the frame structure via the pinion and ring gear. It is also conceivable to connect the gear ring to a gear rack, which in turn is connected to a hydraulic cylinder for driving reciprocatingly in a rectilinear path.

Regarding the drive means of the feed carriage 23 and the movable beam 11, other embodiments are conceivable than those described in the descriptive embodiment. For example, the driving energy source may be in the form of an electric motor provided with a suitable gear reduction unit. It is also possible to replace the chain 56 extended between the front end of the feed carriage and the beam 11 with a wire or the like, similarly as it is also possible to use a multiple of chains or wires and to increase the number of chains 49 extended between the beam and the rear end of the feed carriage, for the purpose of increasing reliability. The cables 54 passing from the feed carriage may to advantage be connected to a resilient cable drum just as expediently as when suspended in cable carriages, as with the exemplary embodiment.

In the exemplary embodiment, the telescopically displaceable beams 10 and 11 have a rectangular or square cross section. The beams, however, may present another cross section, e.g. round, while retaining their function. This presumes, of course, that the beams are provided with some form of guide structure so that they are not able to rotate relative to one another.

In the exemplary embodiment, the frame structure 2 is capable of rotating in its cross direction relative to the slew plate 3 supporting the structure. The reason for this, as previously mentioned, is among other thins to compensate for ground slope and thereby reduce the load on the machine when in operation. As a modification of the invention it is conceivable to provide the machine, for the same reason, with a similar means for also rotating the frame structure in the longitudinal direction relative to the slew plate. However, this will also reduce the risk of the yoke 16 at the end of the movable beam 11 and the top ends of the wood trunks located in the collecting means 25 from coming into contact with the ground in the case of heavily sloping ground, and would render it less difficult to rotate the frame structure in a horizontal plane and to move the machine.

A number of modifications of the exemplified embodiments can also be envisaged in the case of the different handling and processing members of the machine, without trespassing from the purview of the invention. Thus, the debranching means 20 of the exemplary embodiment can be readily replaced by other types of means for debranching felled trees, for example an arrangement in which the debranching chains comprise three separate units, of which two are incorporated with a gripping means and operated thereby, while the third debranching chain is operated by means of a separate drive means. It is also possible to effect the relative movement between the debranching means and the tree during the moment of debranching in a different manner to that described in the exemplary embodiment. This movement can also be effected by arranging that the feed carriage together with the gripping means remains stationary while the debranching means alone effects the movement parallel to the longitudinal direction of the stationary tree, or by arranging for the debranching means to stand still and the feed carriage and gripping means to move, so that the tree is instead conveyed through the debranching means by the feed carriage. In another modification of the described debranching means, the debranching chains can be tensioned by means of other energy storing means than springs, Hydraulic cylinders, oil accumulators and the like are examples of such means.

As with the debranching means, the cutting means 17 intended for severing the standing tree can be replaced by other types of arrangements. An example of one such arrangement is one in which the cutting tool comprises two knives instead of saw chains, the knives being arranged to pivot towards and away from each other about a common shaft, so as to describe an arc which cuts the imaginary cutting position of the trunk in a plane essentially at right angles to the longitudinal direction of the cutting position. If such a cutting means is used, it need not be arranged movably on the yoke, since the opening width of the two cutting tools permits the gripping means 24 of the feed carriage 23 to be inserted therebetween and grip about the end of the tree trunk. Other means are also conceivable within the scope of the inventive idea for maneuvering the cutting means in relation to the standing tree. For example, the movement of the felling yoke and the devices thereon need not necessarily be effected by means of a telescopically extensible jib, but that said movement can also be obtained by means of a crane arm pivoted in a known manner and in the free end of which the yoke with associated devices is mounted.

In the case of the topping means 18, controlled by the debranching means 20, it is not necessary that the cutting tool 132 and the catch 148 be connected to different gripping claws on the debranching means. A fully satisfactory guiding of the tool can also be obtained if they are connected to the same gripping claw or to another suitable means for sensing the diameter of the tree located within the yoke.

In the exemplary embodiment, the gripping claws 121 and 122 of the gripping means 19 and the gripping claws 153 and 154 of the debranching means 20 have been connected together for synchronous movement by means of chains. These chains, however, can well be replaced with bands, wire or the like. Without departing from the idea of the invention the chain may also be replaced by a rail which is secured pivotally between the link of one gripping claw and the other gripping claw. It is also possible to provide the gripping claws with stationarily mounted intermeshing toothed segments. The exemplary embodiment in which chains are used is, however, to be preferred, since it is less space consuming than the embodiment which employs rails or toothed segments, and there is less swinging than when bands, wires or the like are used. If bands are used for synchronizing the rotation of the gripping claws, the band can be extended in the form of a figure eight between wheels and securely mounted on the shafts of the gripping claws and fastened to each wheel. It is suitable in this connection to rotate the band portions one-half turn between the wheels so that they cross each other with the flat surfaces in opposing relationship.

The collecting means 25, to which the tree trunks are passed after being debranched, comprises a loading structure, hereinafter called loading plane, which substantially comprises three holders 170, 171, 172. The number of holders has been selected with respect to the length of the trees to be processed. The number of holders can therefore be greater or smaller than that given in the exemplary embodiment, and varies in dependence of the length of the trunks normally occurring in the district in which the machine is to operate. The distance between the holders may of course also be adapted to the length of the trunks. Although it is said in the aforegoing that the frame structure 2 can be arranged for rotation in its longitudinal direction, to compensate for the ground slope and, among other thins, to prevent the top end of the tree trunks located on the connecting means from coming into contact with the ground, this effect can be obtained in another manner. By relatively simple means it is possible to arrange that the leading holder of the collecting means can be moved vertically and to connect said holder to a suitable drive means, e.g. a hydraulic cylinder, for raising and lowering the same. In this way, when necessitated by ground slope, the top end of the trunks can be raised by lifting the front holder, whereby the portion of the loading plane formed by the holders will slope upwards in a direction towards the top end of the trunk.

In the exemplary embodiment of the bundling means, the rotor 206 is movable axially between two positions, in which it is located on either side of the rotation path of the wire-guiding means 210. In this way correct tensioning of the wire in the gripping claws of the rotor is obtained. This effect can also be obtained, however, by causing the wire-guiding means to move instead of the rotor.

Other modifications of the exemplified bundling means 26 can also be envisaged. Common to all such embodiments is that the bundling medium, which in the exemplary embodiment comprises iron wire, band, chain or the like, is wound on a supply reel and drawn therefrom to a guiding means situated between the beam 6 and the collecting means 25. Before the debranched trunks are conveyed transversely onto the loading plane of the collecting means, the free end of the bundling medium is pulled from the guiding means transversely across the transversal feed path of the trunks, where it is retained during the transversal transport of the trunks which are to form a bundle. The trunks when being conveyed move the bundling medium in front of them onto the loading plane, simultaneously as the medium is unwound from the supply reel to a corresponding degree. When all the trunks which form the bundle are located on the loading plane, the portion of the bundling medium which extends between the trunks and the guiding means is pulled across the feed path of the trunks and is connected with the free end of the bundling medium. When he trunks have been bundled together, the bundling medium is severed between the bundling position and the guiding means. It is also possible to combine the two portions of the bundling medium by moving the free end of the medium to engagement with the other portion, instead of vice versa.

If the bundling medium comprises a band, a thin wire or the like, the bundling sequence is effected in the manner described with reference to the exemplary embodiment. The portions of the bundling medium are tied manually or automatically in a known manner by means of a band or wire lock, known means being used for the purpose.

When the bundling medium is iron wire, band, wire or the like, the main purpose of the bundling operation is to hold the tree trunks in a compact parcel when they are tipped from the machine to the ground. This greatly facilitates subsequent conveyance of the wood. If a coarser bundling medium is used, the bundle can be provided with a lifting eye, which can be gripped by the terrain transport machine, for rapid lifting of the entire bundle. Such a bundling medium may comprise a chain or thick wire, manufactured in lengths adapted to each bundle of wood and having an eye at each end. These relatively short lengths of chain or wire are linked together suitably at the eyes by means of wire or the like, into a long continuous unit which is wound on the supply reel. The method of unwinding the bundling medium from the supply reel is then the same as described with eyes, the guiding means can easily be designed so as to permit only one chain or wire to pass at each bundling operation. This can be effected for example with the assistance of a manually or automatically controlled catch means, which in its active position prevents the rear eye of a chain or wire unit from being drawn from the guiding means when the front eye is drawn transversely across the feed path of the trunks. When the two eyes are brought together, the catch means is released, whereupon the rear eye leaves the guiding means simultaneously as it is passed by the means which brings the eyes together. As the trunks are conveyed transversely, the chain or wire is carried by the trunks into the loading plane of the collecting means in the same manner as when bundling is effected with iron wire. The two eyes are then secured together either manually or automatically in some suitable manner by means of appropriate securing means. Subsequent to securing the eyes together, the iron wire or the like which connects the chain or wire tied around the wood bundle is severed from the chain or wire unit issuing from the guiding means.

If one eye on the chain or wire units is made larger than the other, the eyes can be secured at the final bundling stage by passing the smaller eye through the larger, whereafter the chain or wire is drawn tightly around the wood bundle in the fashion of a snare. In this instance, it is convenient that the smaller eye is held stationary at the loading plane as long as possible while the wood bundle is tipped therefrom. In this way, the chain or wire is drawn about the bundle as it falls from the loading plane, so that the bundle is well compacted and tightly secured when it reaches the ground.

In the description of the various hydraulically driven devices of the machine no mention has been made of those control means and components which are normally included in hydraulic drive systems but which have no part to play in describing the inventive idea. In the case of the hydraulic system for the cutting means 17, however, a particularly suitable embodiment can be envisaged, by which it is possible to coordinate with each other automatically the movements of the saw chains and the saw guide plate. The reason for this is constantly to obtain from a loading aspect a well adapted relationship between the cutting force of the saw chains and the feed rate of the saw guide plate, which reduces wear and tear on the saw chains and the mechanism driving the same. FIG. 19 shows such an embodiment. In the figure references 237 and 238 indicate two hydraulic pumps, which are connected between the oil container 30 and the hydraulic motor 108 of the saw chains and the hydraulic cylinder 107 for feeding the saw guide plate. A branch line 240 is passed from a connecting line 239 between the pump 237 on the hydraulic motor to the piston side of the hydraulic cylinder. Connected to the branch line, which is of considerably smaller cross-sectional area than line 239, is a nonreturn valve 241, through which oil can flow in only one direction from the pump 237. A bypass line 242 passes over the nonreturn valve and incorporates a throttle plate 243. Between the hydraulic motor 108 and the oil container 30 is connected a return line 244 for returning the oil from the motor. This line also incorporates a throttle plate 245. The pump 238 is connected to the oil container and the piston rod side of the hydraulic cylinder by means of two lines 246 and 247. In the line 247 there is connected a nonreturn valve 248 through which the oil an flow from the pump in only one direction. Also connected in this line is a manually operatable valve 249, with which the hydraulic cylinder can be alternatively connected with the pump 238 or with the pil container via a line 250.

In the exemplary embodiment, the pump 238 comprises a pressure compensating pump, which delivers oil only when it is failed to reach a certain pressure in the line 247. The normal working pressure of the pump is approximately 225 kg./cm.$^2$. It is, however, not necessary that the pump is pressure compensating, but that the inclusion of an oil accumulator in the line between the pump and the hydraulic cylinder can also be envisaged, thereby to ensure the supply of oil to the cylinder under a substantially constant pressure. The pump 237 has a working pressure of approximately 175 kg./cm.$^2$ and delivers a substantially constant quantity of oil per unit of time. The hydraulic cylinder 107 is of conventional type and has an operative pressure area of 25 cm.$^2$ on the piston rod side and 33 cm.$^2$ on the piston side. As previously described, the saw guide plate is fed when the hydraulic cylinder is retracted. The feed direction of the piston of the hydraulic cylinder is indicated in the figure by an arrow A.

The hydraulic system of the exemplary embodiment functions in the following manner. If the working resistance of the saw chains increases during the cutting operation, the oil pressure in the lines 239 and 240 also increases and thereby also the pressure on this side of the throttle plate 243. Since the pump 238 maintains a constant pressure on the piston rod side in the hydraulic cylinder and the flow rate of the oil through the line 240 is proportional to the pressure drop over the throttle plate 243, the increase in pressure in the line 240, between the throttle plate and the line 239, causes the piston to be subjected to an increased resistance at its movement in the feed direction (arrow A). This means that the piston speed and thereby the feed speed of the saw guide plate decreases to a corresponding extent. If, in spite of this, the saw chains are so heavy in operation that the pressure in the line 239 exceeds the normal working pressure (175 kg./cm.$^2$) of the pump 237 the piston turns and moves in the opposite direction. The guide saw plate is thus withdrawn so that the saw chains pass out of engagement and the working resistance ceases. This results in an immediate reduction in pressure on the piston side of the hydraulic cylinder, whereupon the piston once again moves in the feed direction. When cutting of the tree has been terminated, the saw guide plates are moved apart. This is effected by means of the valve 249, which is reset so that the connection between pump 238 and the piston rod side of the hydraulic cylinder is broken and is instead connected with the oil container. When the valve is reset, the pressure falls rapidly on the piston rod side, whereupon the piston is moved in the feed direction and the saw guide plates are parted by the pressure which remains on the piston side, as a result of the resistance to flow in the line 244.

Alternatively, the pump 237 and the hydraulic motor can be connected in a closed pipe system together with a feed pump, the feed pressure being sufficiently high to separate the saw guide plates when the saw chains are stationary.

We claim:

1. A machine for felling, debranching, topping, collecting and bundling trees characterized by combination of a horizontally rotatable frame structure mounted on a support structure, a vertically rotatable longitudinally extending jib arranged on the frame structure, a gripping means for holding a tree standing on its roots and retaining said tree when it is felled, a first means for cutting the standing tree, a means for felling the tree when it has been cut, a means for debranching the felled tree and a means for feeding the tree during the debranching operation in its longitudinal direction through the debranching means, the first cutting means also being adapted to sever the portion of the tree which during it advancement has passed through the debranching means, a second cutting means for automatically cutting a tree at a predetermined minimum diameter of the portion of the tree which during its advancement has passed through the debranching means, a means for collecting the debranched trees or portions of trees, a means for bundling said trees or portions thereof by means of iron wire, bands, wires, chains or the like, and means for mechanically driving the aforementioned movable devices, the means for holding, cutting, felling, and debranching the tree being mounted on one end of the jib, the feed means being displaceable along the jib, and the collecting means and the bundling means being mounted on the frame structure adjacent each other.

2. The machine of claim 1, characterized in that the jib arranged for rotation on the frame structure comprises two beams presenting a box-shaped or tubular cross section, of which one beam is telescopically insertable in the other beam and supports at its free end the devices for holding, cutting, felling and debranching the tree and the drive means for said devices, the displaceable beam and the feed means being connected to a common drive means such as one or more hydraulic cylinders, hydraulic motors, electric motors or combustion motors, so that they move synchronously with each other and in opposite direction.

3. The machine of claim 2, characterized in that hydraulic pumps and oil containers connected to the free end of the displaceable beam are mounted on the feed means.

4. The machine of claim 1, characterized in that the tree-felling means is in the form of a yoke provided with a front and rear end and on which the debranching means the second cutting means, the holding means and the first cutting means are arranged in said order from the front end of the yoke, the yoke being rotatably arranged in the free end of the displaceable beam, partly in a vertical plane between a position parallel with the beam, in which the front end of the yoke is directed outwardly from the beam, and a substantially vertical position, in which the front end of the yoke is directed upwardly, and partly in a plane at right angles thereto.

5. The machine of claim 4, characterized in that the debranching means comprises two hydraulically driven gripping claws pivotally journaled on the yoke of the felling means and two longitudinally extending debranching chains, which comprise cutting tools which are pivotally secured together and the edges of which are turned towards the feed direction of the tree, each debranching chain being secured at its ends between the gripping end of respective gripping claws and an energy-storing means connected with the gripping claws for tensioning the debranching chains.

6. A machine of claim 5, characterized in that the holding means comprises two hydraulically driven gripping claws pivotally journaled on the yoke, and that both the gripping claws and the gripping claws of the debranching means are securely mounted on shafts, which are connected to respective drive means, each shaft also carrying two stationarily mounted wheels, between which two chains, bands, wires or the like are passed in the form of two inverted S: s and at their ends are connected to wheels for synchronous driving of the shafts and the gripping claws.

7. The machine of claim 5, characterized in that the holding means comprises two hydraulically driven gripping claws pivotally mounted on the yoke of the felling means, and that both these gripping claws and the gripping claws of the debranching means are securely mounted on shafts which are connected to respective drive means, each shaft also carrying a stationary mounted wheel and that an endless band is passed in the form of a figure eight while simultaneously twisting each band portion one-half turn between the wheels, the band being secured to both wheels for synchronous driving of the shafts and gripping claws.

8. The machine of claim 4, characterized in that the first cutting means comprises two cutting units which are arranged on either side of the cutting position of the tree and are securely connected to two parallel rotatably journaled shafts, which in turn are connected to one and the same source of energy for synchronous rotation, said cutting units each including a rotatably mounted drive wheel over which an endless saw chain is curved, the drive wheel being connected to a motor for driving the saw chain.

9. The machine of claim 8, characterized in that each cutting unit comprises a saw guide plate and a holder attached thereto, and direction changing wheels journaled for rotation on the holder, in addition to the drive wheel the saw chain also being curved over the direction changing wheels and that the axes of rotation of the units are journaled only on one side of the cutting units.

10. The machine of claim 9, characterized in that the number of wheels over which respective saw chains are curved and the drive wheel are at least three and that one, of the nondriving wheels is displaceably arranged in a radial direction relative to the remaining wheels.

11. The machine of claim 9, characterized in that the saw guide plate and the holder of each cutting unit forms a closed, triangular-shaped unit, in the corners of which are arranged the wheels over which the saw chains are passed.

12. The machine of claim 8, characterized in that the drive means of the saw chains and rotation shafts of the first cutting means are respectively connected to a first and a second hydraulic pump mounted on the feed means, the drive means of the rotation shafts being connected also to the pressure side of the first pump whereby an increase in working resistance of the saw chains causes an increase in pressure in the connection between the first pump and the drive member, this increase in pressure counteracting the movement of the drive means of the rotation shafts caused by the second pump.

13. The machine of claim 4, characterized in that the second cutting means comprises a cutting tool, the edge of which extends transversely of the direction in which the tree is advanced and is turned towards the tree and the direction of feed, the tool being movably arranged on the yoke of the felling means between an inactive and an active position, in which latter position it cuts the tree when it passes the tool during transport in the feed direction.

14. A machine of claim 13, characterized in that the tool is connected with one gripping claw of the debranching means and is moved by the same away from the feed path when the gripping claws are opened and towards the feed path when the gripping claws are closed synchronously with movements of the gripping claws.

15. A machine of claim 14, characterized by a catch member connected with one of the gripping claws of the debranching means and adapted to temporarily hold the tool in an inactive position while the gripping claws are closed independent of the position of the gripping claw connected with the tool.

16. The machine of claim 1, characterized in that the first cutting means is arranged displaceably parallel with the feed direction of the tree between two end positions and can be locked in said end position.

17. The machine of claim 1, characterized in that the collecting means comprises an elongated loading plane which extends parallel with the frame structure or is slightly inclined upwardly to the feed direction, one or more loading members for transporting the debranched trunks transversely from the feed path in which they are fed longitudinally to the loading plane, and two or more catch members, the loading plane being pivotally mounted on the frame structure in a plane perpendicular to the longitudinal direction of the trunks on the loading plane and at a lower level than the path along which the trunks are fed longitudinally, between a position obliquely downwardly directed to the ground and a substantially vertically upwardly directed position, the loading members being adapted to transport the debranched trunks or trunk portions crosswise onto the loading plane subsequent to said trunk or trunk portions being released from the feed means and the debranching means, and catch members being adapted to permit said crosswise transport of the trunks but automatically prevent the trunks or trunk portions from being returned from the loading plane to the frame structure.

18. The machine of claim 17, characterized in that the loading plane comprises at least two separated, parallel elongated holders, which extend transversely of the longitudinal direction of the jib, the holder situated nearest the yoke of the felling means being movably arranged on the frame structure at right angles thereto, whereby the loading plane formed by the holders can be rotated about a center line through the holder situated farthest away from the yoke.

19. The machine of claim 1, characterized in that the bundling means comprises a rotatably mounted supply reel on which the bundling medium for use in the bundling operation is stored, a guiding means to which the bundling medium is passed from the supply reel, a carrier or dog member adapted to pass the free end of the bundling medium from the guiding means across the transverse feed path of the trunks and crossing said path, a retaining means adapted to retain the free end on the bundling medium in the thus given position while the tree trunks are being advanced crosswise and collected a means for securing the free end of the bundling medium with the portion of the bundling medium issuing from the guiding means subsequent to collecting the trunks, a means for connecting together the thus connected portions of the bundling medium and a means for severing the portion of the bundling medium issuing from the guiding means between the said guiding means and the connecting position.

20. A machine of claim 19, characterized in that the bundling medium comprises an iron wire, wire, chain, a band or the like.

21. The machine claim 1, characterized in that the bundling means comprises a rotatably mounted supply reel on which iron wire intended for bundling purposes is stored, a guiding means through which the iron wire is passed on the supply reel, a rotatably mounted, double-arm rotor provided with a first and a second gripping means diametrically positioned and mounted in the periphery thereof, of which the first gripping means is provided with a cutting edge for automatically cutting the iron wire when it is held by the gripping means, a wire-guiding means provided with gripping means, the wire-guiding means being movably arranged immediately adjacent the guiding means and the gripping means of the rotor situated nearest the wire-guiding means with respect to the position of rotation of the rotor, and by means for mechanically driving the movable members of the bundling means, the wire-guiding means being arranged so that when it is activated it grips together with gripping means the iron wire projecting out from the guiding means and during continued movement passes it to the other gripping means of the rotor when this is adjacent the movement path of the wire-guiding means, the bundling means being arranged relative to the collecting means so that the wire passing between the guiding passage means and the rotor extends between the collecting means and the feed path of the wire and is carried by the tree trunks during their crosswise movement to the collecting means while simultaneously supplying wire from the supply reel and the wire-guiding means is adapted to reengage the portion of the wire projecting from the guiding means when the wire is fastened in the other gripping means of the rotor during movement from the starting position and fasten the wire in the first gripping means of the rotor when said gripping means, subsequent to being rotated by the rotor, is located adjacent the movement path of the wire guiding means, the wire being cut by the cutting edge of the gripping means of the rotor between said gripping means the guiding means after being secured and the rotor is made to rotate so that the wire is wound around the bundle and then drawn out of engagement with the gripping means of the rotor.

22. The machine of claim 21, characterized in that the rotor or wire-guiding means are displaceable in a direction transversely of the movement path of the wire-guiding means synchronously with rotation of the rotor between a first and a second position, the rotor in the first position being located between the guiding means and the movement path of the wire-guiding means with the second gripping means situated adjacent said movement path, and in the second position is located outside the movement path of the wire-guiding means, so that it extends between the guiding means and the rotor, with the first gripping means situated adjacent the movement path of the wire-guiding means.

23. The machine of claim 21, characterized in that the gripping means of the wire-guiding means and the rotor comprise wedge-shaped recesses in which the wire is clamped as a result of the wedging action of the recesses, the recesses of the rotor having a more pointed wedge shape than the recesses of the wire guiding means and thereby a stronger clamping action than the latter recess.

* * * * *

UNITED STATES PATENT OFFICE
CERTIFICATE OF CORRECTION

Patent No. 3,620,272                    Dated   November 16, 1971

Inventor(s)   Erik Helmer Eriksson et al.

It is certified that error appears in the above-identified patent and that said Letters Patent are hereby corrected as shown below:

On the cover sheet [73] Assignee, "Domsj" should read -- Domsjö --. Column 3, line 20, "movable" should read -- movably --. Column 6, line 48, "member," should read -- member. --. Column 8, line 73, "teo" should read -- two --. Column 13, line 17, "or" should read -- of --. Column 15, line 50, cancel "it". Column 21, line 67, "he" should read -- the --. Column 22, line 18, after "same" insert -- as that described when bundling with iron wire. Since the chains and wires --. Column 23, line 5, "an" should read -- can --. Column 24, line 1, "it" should read -- its --. Column 26, line 21, "while" should read -- whilst --; line 33, after "machine" insert -- of --.

Signed and sealed this 6th day of March 1973.

(SEAL)
Attest:

EDWARD M. FLETCHER, JR.                    ROBERT GOTTSCHALK
Attesting Officer                          Commissioner of Patents